United States Patent [19]

Sato

[11] Patent Number: 5,467,454
[45] Date of Patent: Nov. 14, 1995

[54] BUS USE REQUEST ADJUSTING APPARATUS ALLOWING CHANGING PRIORITY LEVELS

[75] Inventor: Fumiki Sato, Hyogo, Japan

[73] Assignee: Mitsubishi Denki Kabushiki Kaisha, Tokyo, Japan

[21] Appl. No.: 125,903

[22] Filed: Sep. 24, 1993

[30] Foreign Application Priority Data

Sep. 29, 1992 [JP] Japan ..................... 4-283983

[51] Int. Cl.⁶ .................. G06F 13/36; G06F 9/46
[52] U.S. Cl. ................ 395/296; 340/825.5; 370/85.2; 364/242.6; 364/242.92; 364/240.1; 364/228; 364/242.8; 364/DIG. 1
[58] Field of Search ................ 395/325, 725, 395/275, 425, 650; 370/85.1, 85.2, 85.6; 340/825.5, 825.51

[56] References Cited

U.S. PATENT DOCUMENTS

| | | | |
|---|---|---|---|
| 4,001,783 | 1/1977 | Monahan et al. | 395/650 |
| 4,229,791 | 10/1980 | Levy et al. | 395/325 |
| 4,237,534 | 12/1980 | Felix | 395/325 |
| 4,320,467 | 3/1982 | Glass | 395/325 |
| 4,752,872 | 6/1988 | Ballatone | 395/325 |
| 4,760,515 | 7/1988 | Malmquist et al. | 395/325 |
| 4,987,529 | 1/1991 | Craft et al. | 395/325 |
| 5,034,881 | 7/1991 | Hoashi et al. | 395/325 |
| 5,140,682 | 8/1992 | Okura et al. | 395/425 |
| 5,193,193 | 3/1993 | Iyer | 395/725 |
| 5,261,109 | 11/1993 | Cadambi et al. | 395/725 |
| 5,265,223 | 11/1993 | Brockmann et al. | 395/325 |
| 5,301,279 | 4/1994 | Riley et al. | 395/275 |
| 5,307,466 | 4/1994 | Chang | 395/325 |
| 5,392,436 | 2/1995 | Jansen et al. | 395/725 |

OTHER PUBLICATIONS

*7700 Series User's Manual*, Mitsubishi Electric Corporation, Tokyo, Japan 1988, cover pages, table of contents, pp. 2–14, 2–15, 2–16 (translation included).

*Primary Examiner*—Gopal C. Ray
*Attorney, Agent, or Firm*—Townsend and Townsend and Crew

[57] ABSTRACT

The bus use efficiency is improved by using a priority level determiner for determining a priority level of a processor to be connected and determining whether to compare the priority level of the processor with that of other processor until a signal indicating the end of a series of processings of the processor becomes valid after a bus use request signal of the processor becomes valid or to compare the priority level of the processor with that of other processor only while the bus use request signal is valid.

8 Claims, 15 Drawing Sheets

BRQDMA, HOLD, BRQREF: INTERRUPT REQUEST SIGNAL
BSYDMA, BSYCPU, BSYREF.: SIGNAL INDICATING THAT PROCESSING CANNOT BE INTERRUPTED

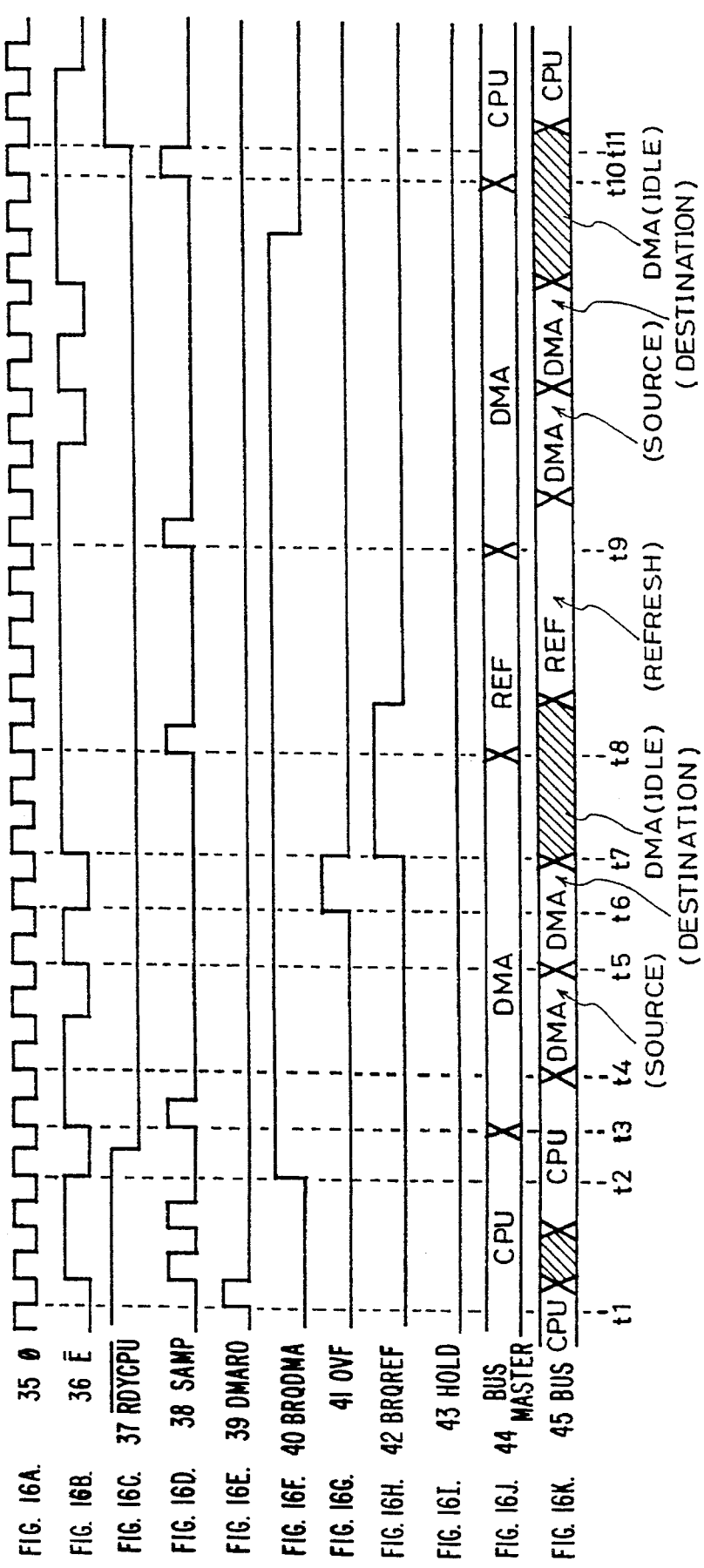

BUS USE REQUEST ADJUSTING APPARATUS ALLOWING CHANGING PRIORITY LEVELS

BACKGROUND OF THE INVENTION

1. Field of the Invention

The present invention relates to a microcomputer, particularly to a bus use request adjusting apparatus for a plurality of data processors including a CPU, direct memory access unit (hereafter referred to as DMA processor) in the microcomputer to output a bus use request.

2. Description of the Prior Art

FIG. 14 is a block diagram of a microcomputer system using a bus use request adjusting apparatus according to the prior art. In FIG. 14, symbol 1 is a CPU (central processing unit), 2 is an interrupt control unit (ICU) for adjusting interrupt request signals INT0 and INT1 outputted from peripheral units and sending an interrupt request to the CPU 1, and 3 is a DMA process (DMA) for adjusting direct memory access (hereafter referred to as DMA) request signals DMAR0 and DMAR1 outputted from peripheral units. Symbol 4 is an address bus and 5 is a data bus. Memory units and peripheral units such as DRAM and ROM, though not illustrated in FIG. 14, are connected with the microcomputer system by the address bus 4 and data bus 5. Symbol 6 is a refresh control unit (REF) for refreshing the DRAM, which stores a counter to obtain a refresh time interval. Symbol 7 is a synchronous clock generator (CLK) for generating a synchronous clock of the CPU 1. Symbol 8 is a bus use request adjusting apparatus for adjusting a bus use request of the DMA processor 3, an external bus use request (hereafter referred to as a hold request), and a bus use request of the refresh control unit 6, in which symbol 129 shows a system synchronizing signal Ø and which stores a selection circuit to be mentioned later.

Symbol 9 is a signal line for inputting a signal BUSY indicating that the CPU 1 is busy to the bus use request adjusting apparatus 8, 10 is a signal line for inputting a bus use request signal BRQDMA of the DMA processor (SMA) 3 to the bus use request adjusting apparatus 8, 11 is a signal line for inputting a signal DMSC indicating a breakpoint for DMA transfer to the bus use request adjusting apparatus 8, 12 is a signal line for inputting a signal HOLD indicating a hold request to the bus use request adjusting apparatus 8, 13 is a signal line for inputting a bus use request signal BRQREF of the refresh control unit (REF) 6 to the bus use request adjusting apparatus 8, and 14 is a signal line for inputting a signal REFE indicating the end of refresh to the bus use request adjusting apparatus 8.

Symbol 15 is a signal line for inputting a bus use permission signal CPUST for the CPU 1 from the bus use request adjusting apparatus 8 to the CPU 1, 16 is a signal line for inputting a bus use permission signal DMAST for the DMA processor (DMA) 3 from the bus use request adjusting apparatus 8 to the DMA process (DMA) 3, 17 is a signal line for outputting a response signal HOLDA for a hold request, 18 is a signal line for inputting a bus use permission signal REFST for the refresh control unit (REF) 6 from the bus use request adjusting apparatus 8 to the refresh control unit (REF) 6. Symbol 19 is a signal line for inputting a signal RDY for inhibiting generation of a synchronous clock from the bus use request adjusting apparatus 8 to the synchronous clock generation circuit 7, and 20 is a signal line for inputting a CPU synchronous clock Ø CPU from the synchronous clock generation circuit 7 to the CPU 1.

FIG. 15 is a block diagram of a selection circuit 8a in the bus use request adjusting apparatus 8 according to the prior art for deciding a unit to which bus use permission is assigned when a bus use request from the DMA processor (DMA) 3 and the hold request and refresh control unit (RE) 6 are completed. In FIG. 15, symbols 21, 22, and 23 are input terminals for the bus use request signal BRQDMA, signal HOLD, and bus use request signal BRQREF respectively, and symbols 24, 25, 26, and 27 are output terminals for the bus use permission signal CPUST, bus use permission signal DMAST, response signal HOLDA, and signal REFST. Symbol 28 is a logic gate which outputs the logic "1" only when the logic "0" is inputted from every terminal with a circle "O". Symbols 29 and 30 are logic gates which output the logic "1" only when the logic "1" is inputted from terminals with no circle "O" and the logic "0" is inputted from those with a circle "O". Symbols 31, 32, 33, and 34 are latch circuits which hold input data for a bus use request at the rise of a pulse SAMP indicating the end of bus use to be generated when the CPU 1 does not use any bus if bus use permission is assigned to the CPU 1 or at the breakpoint for DMA transfer if bus use permission is assigned to the DMA processor (DMA) 3, or when the signal HOLD comes to the logic "0" under the bus release state by the hold request or at the end of refresh if bus use permission is assigned to the refresh control unit (REF) 6. In this case, the pulse SAMP is a signal which indicates that bus use ends at the present and comes to "1" when the synchronous clock Ø is "1" at the end of refresh, where the CPU 1 does not use any bus and at the breakpoint for DMA transfer or where the signal HOLD comes to the logic "1" under the bus release state by the hold request.

Moreover, for the selection circuit 8a, priority is given to the bus use request BRQDMA, signal HOLD, and bus use request signal BRQREF by the logic gates 29 and 30, in which the signal HOLD is prior to the bus use request signal BRQDMA and the bus use request signal BRQREF is prior to the signal HOLD. According to the priority, only one signal is selected even if two or more signals among the bus use request signal BRQDMA, signal HOLD, and bus use request signal BRQREF are inputted. If no signal is inputted (three inputs are "0"), the bus use request signal CPUST of the CPU 1 is resultingly synthesized by the logic gate 28.

The operation according to the prior art is described below by referring to FIGS. 14 and 16. FIG. 16 is a timing chart showing the operation of the above microcomputer system. In FIG. 16, symbol 35 is a synchronous clock Ø, 36 is a signal E (reverse) which is generated by the CPU 1 and comes to the logic "0" when data in the data bus is valid, 37 is a signal RDYCPU (reverse) which is an internal signal of the synchronous clock generator (CLK) 7 and comes to the logic "0" when stopping the synchronous clock Ø CPU for the CPU 1, and 38 shows the state of the pulse SAMP. In this case, the synchronous clock Ø is different from the CPU synchronous clock Ø cpu. When the system operates, the signal RDY is not always outputted to the signal line 19 but the synchronous clock generator 7 generates the synchronous clock Ø. That is, the CPU synchronous clock Ø cpu is a signal produced from the synchronous clock Ø and the signal RDYCPU (reverse) by the synchronous clock generator (CLK) 7, which is kept at "0" while the signal DYCPU (reverse) equals "0". Symbol 39 is a DMA signal DMAR0 and 40 shows the state of the bus use request signal BRQDMA. Symbol 41 is a signal OVF which is outputted by a counter stored in the refresh control unit (REF) 6 and comes to the logic "1" when the counter overflows and 42 shows the state of the bus use request signal BRQREF.

Symbol 43 shows the state of the signal HOLD. Symbol 44 shows the units {CPU 1, DMA processor (DMA) 3, and refresh control unit (REF) 6} which receive bus use permission at each time and 45 shows an address in the address bus 4 corresponding to an operational state of each unit.

In this case, it is assumed that the DMA process (DMA) 3 is set so as to perform DMA transfer twice under the burst state when receiving the DMA signal DMAR0. At the time of T1, the DMA signal DMAR0 is inputted to the DMA processor (DMA) 3 from an external unit (symbol 39 in FIG. 16). Then, the DMA processor (DMA) 3 causes the bus use request signal BRQDMA to rise at the time of T2 (symbol 40 in FIG. 16). When the pulse SAMP rises at the time of T3, the bus use permission signal DMAST is outputted from the selection circuit 8a (symbols 38, 40, 42, and 43 in FIG. 16) because signals at the logic "0" are the signal HOLD and the bus use request signal BRQREF and a signal at the logic "1" is only the bus use request signal BRQDMA. Therefore, the DMA processor (DMA) 3 obtains the bus use right to start DMA transfer. The address bus states DMA (source) and DMA (destination) at the times of T4 and T5 shows that the transfer-source address and transfer-destination address in DMA transfer are outputted to the address bus. DMA (idle) shown in FIG. 16 is the state in which the DMA process performs internal processings using no bus (symbol 45 in FIG. 16).

At the time of T6 where the counter stored in REF 6 overflows and the signal OVF indicating that the DRAM refresh time expires rises, the refresh control unit (REF) 6 causes the signal BRQREF to rise at the time of T7 (symbols 41 and 42 in FIG. 16). When the pulse SAMP rises at the time of T8, signals at the logic "1" are the bus use request signal BRQDMA and bus use request signal BRQREF among the bus use request signal BRQDMA, signal HOLD, and bus use request signal BRQREF (symbols 38, 40, and 42 in FIG. 16). Therefore, the bus use permission signal REFST (FIG. 15) is outputted from the selection circuit according to the above priority. Thereby, the refresh control unit (REF) 6 obtains the bus use right to start the refresh of DRAM (not illustrated). However, because DMA transfer has not terminated yet, the bus use request signal BRQDMA is kept at the logic "1" even during the refresh.

When the refresh terminates at the time of T9, the pulse SAMP rises (symbol 38 in FIG. 16). At this point of time, a signal at the logic "1" is only the bus use request signal BRQDMA among the bus use request BRQDMA, signal HOLD, and bus use request signal BRQREF. Therefore, the DMA process (DMA) 3 obtains the bus use right to restart DMA transfer which has been interrupted (symbols 40, 42, and 43 in FIG. 16).

When DMA transfer terminates at the time of T10, the pulse SAMP rises (symbol 38 in FIG. 16). At this point of time, the CPU 1 obtains the bus use right because the bus use request signal BRQDMA, signal HOLD, and bus use request signal BRQREF come to the logic "0" (symbols 40, 42, and 43 in FIG. 16). Then, the signal RDYCPU (reverse) rises at the time of T11, stop of the synchronous clock ∅ CPU is released, and the CPU 1 restarts the processing which has been interrupted. The latch circuits 31 to 34 fetch the output signals of the logic gates 28, 29, and 30 and the signal BRQREF respectively when the pulse SAMP equals "1" and latch them while the pulse SAMP equals "0". At the time of T10, only the output of the logic gate 28 is "1" and others are "0" among the signal BRQREF, signal HOLD, and signal BRQDMA. This state is fetched to the latch circuits 31 to 34 while the pulse SAMP equal "1" at the times of T10 and T11 and latched at the time of T1 forward (symbol 37 in FIG. 16).

Because the system and bus use request adjusting apparatus of the existing microcomputer is constituted as described above, the bus use request priority predetermined for each unit cannot be changed or a unit with a low priority cannot use a bus even if the bus is idle while a unit with a high priority obtains the bus use right. Therefore, there is a problem that the bus use efficient is decreased.

SUMMARY OF THE INVENTION

The present invention is made to solve the above problem and its first object is to provide a bus use request adjusting apparatus for determining whether to compare the priority level of the above unit with that of other unit.

The second object of the present invention is to provide a bus use request adjusting apparatus for improving the bus efficiency after meeting the first object.

The first invention (corresponding to claim 1), as shown in FIGS. 1 to 3, is a bus use request adjusting apparatus which connects with a plurality of processors (DMA processor, etc.) for outputting a bus use request signal indicating that processing can be interrupted and a signal indicating that the processing cannot be interrupted and comprises memory means (registers 134, 151, and 152) for holding bus use request priority levels corresponding to the processors, comparison means (comparator 141) for comparing a received bus use request signal with a priority level, selection means 124 for assigning bus use permission to one of the processors (DMA processor, etc.) of the bus use request source at a priority level according to the comparison result, and output control means 125 for outputting a bus use permission signal when none of the processors output the bus use request signal.

Moreover, the second invention (corresponding to claim 5), as shown in FIGS. 5 to 7, is a bus use request adjusting apparatus which connects with a plurality of processors (DMA processor, etc.) for outputting at least one of the bus use request signal BRQDMA, signal indicating that processing cannot be interrupted, and signal indicating the end of the processing, and comprises memory means (registers 134, 151, and 152 for holding bus use request priority levels corresponding to the processors, comparison means (comparator 141) for comparing a received bus use request signal with a priority level, selection means 124 for assigning bus use permission to a processor of the bus use request source with a high priority level according to the comparison result, determination means (priority level determiner 135) for comparing a bus use request priority level with a predetermined specific level and outputting a determination signal, holding means 123 for holding a bus use request signal sent from a processor until a signal indicating the end of processing is inputted according to the determination signal, and output control means 125 for changing bus use permission signals when none of the processors output a signal indicating that processing cannot be interrupted.

The bus use request adjusting apparatus of the first invention changes a priority level by changing the data in the memory means (registers 134, 151, and 152) for holding priority levels, compares a bus use request signal received from each processor (DMA processor, etc.) with a priority level, assigns interrupt permission to a processor of the bus use request source with a high priority level according to the comparison result, and adjusts bus use requests by changing interrupt permission signals when none of the processors output a signal indicating that processing cannot be interrupted.

The interrupt adjusting apparatus of the second invention compares a received bus use request signal with a priority level, assigns bus use permission to a processor of the bus use request source with a high priority level according to the comparison result, compares a bus use request priority level with a predetermined specific level and outputs a determination signal, holds bus use request signals from processors (DMA processor, etc.) until a signal indicating the end of processing is inputted when the determination signal is H, and adjusts bus use by changing bus use permission signals when none of the processors output a signal indicating that processing cannot be interrupted or by outputting the bus use permission signal (bus use request permission DMAST) when none of the processors output a signal BSYREF indicating that processing cannot be interrupted if interrupt of a series of processings occurs in the processor provided with the permission even before a signal indicating the end of processing in inputted when the determination signal is L.

The above and other objects, features, and advantages of the invention will become more apparent from the following description when taken in conjunction with the accompanying drawings.

BRIEF DESCRIPTION OF THE DRAWINGS

FIG. 16 is a timing chart showing the operation of the microcomputer system using a bus use request adjusting apparatus according to the prior art.

DESCRIPTION OF THE PREFERRED EMBODIMENTS

Embodiment 1

Figure 1:
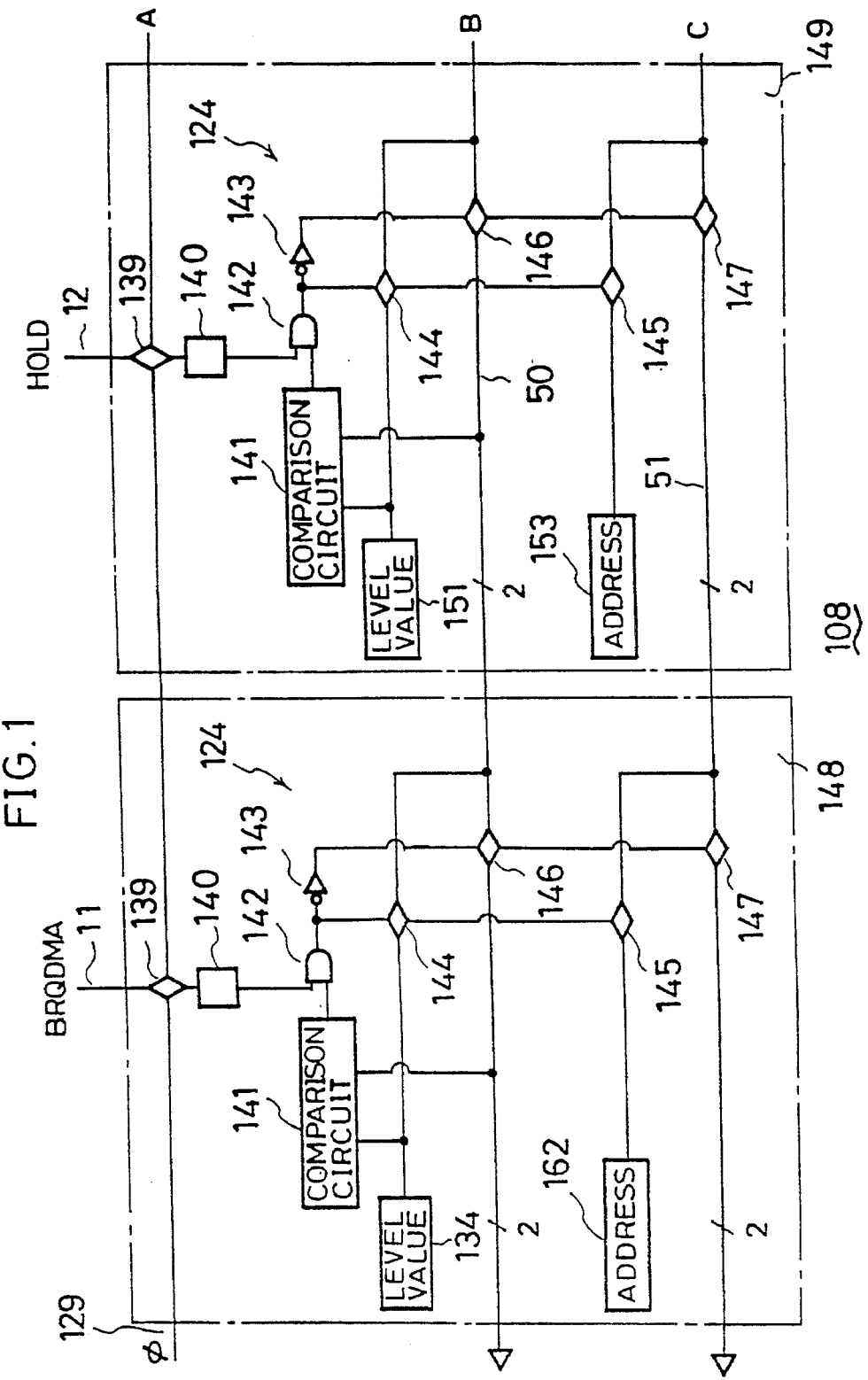
FIG. 1 is a partial block diagram of the bus use request adjusting apparatus of the first embodiment of the present invention.
Figure 3:
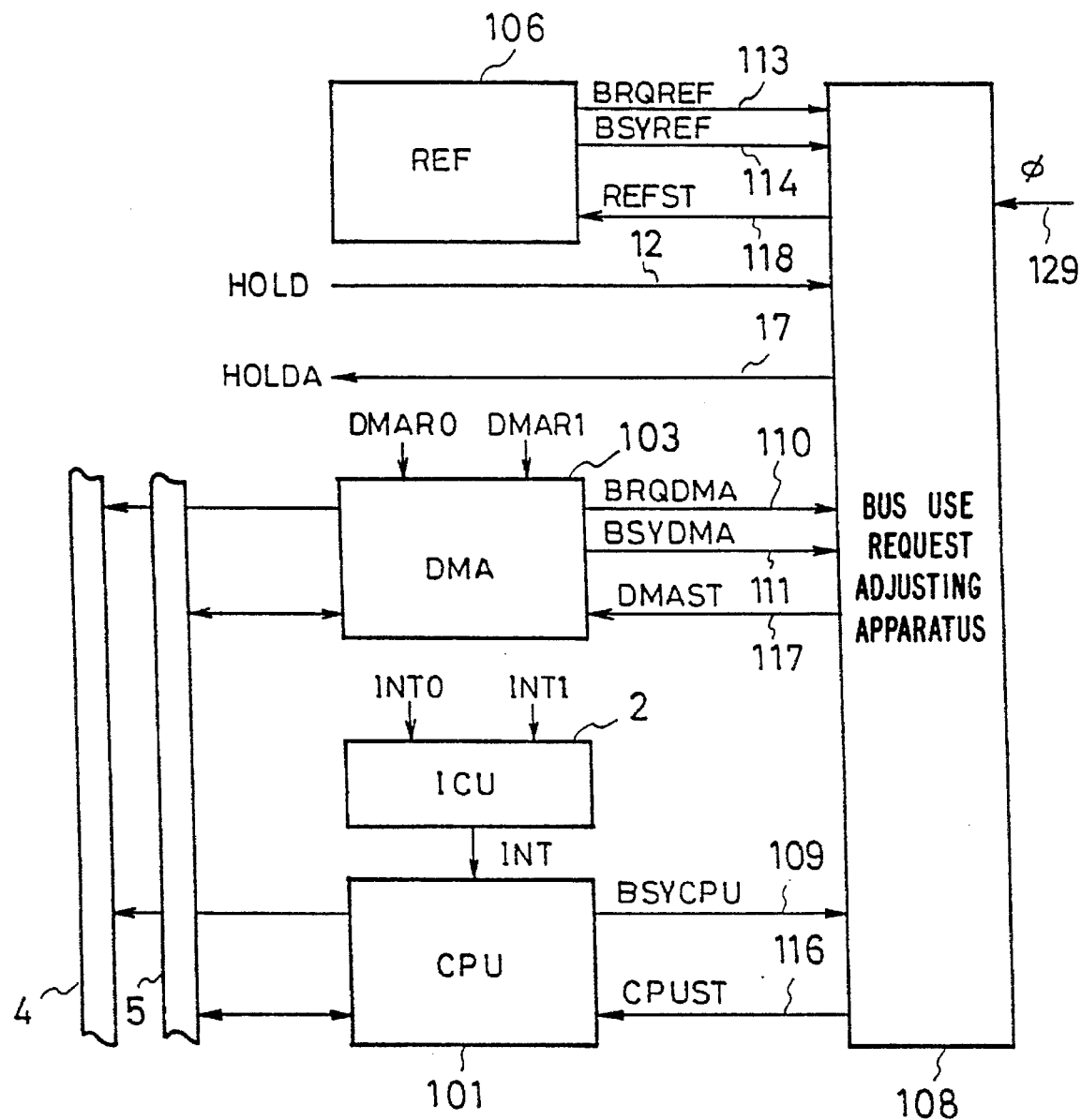
FIG. 3 is a block diagram showing the entire constitution of the microcomputer system using the bus use request adjusting apparatus of the first embodiment of the present invention.

The present invention is described below starting with the first embodiment by referring to the drawings. FIG. 1 is a block diagram showing the entire constitution of the microcomputer system using the bus use request adjusting apparatus of the first embodiment of the present invention. In FIG. 3, symbol 101 is a CPU, 2 is an interrupt control unit (ICU) for adjusting bus use request signals INT0 and INT1 received from a peripheral unit (not illustrated) and sending them to the CPU 1 and 103 is a DMA processor for adjusting the DMA request signals DMAR0 and DMAR1 received from a peripheral unit or the like before performing DMA transfer. Symbol 4 is an address bus and 5 is a data bus. Though not illustrated in FIG. 3, memories such as DRAM and ROM and peripheral units are connected with the microcomputer system by the address bus 4 and data bus 5. Symbol 106 is a refresh control unit (REF) for refreshing the DRAM, which stores a counter for obtaining the refresh time interval. Symbol 108 is a bus use request adjusting apparatus for adjusting bus use requests from the DMA processor (DMA) 103, and the external hold request (HOLD12) and refresh control unit (REF) 106.

Symbol 109 is a signal line for inputting the signal BSYCPU indicating a state in which the CPU 101 cannot interrupt processing, for example, a state in which it uses any bus to the bus use request adjusting apparatus 108. Symbol 110 is a signal line for inputting the bus use request signal BRQDMA of the DMA processor (DMA) 103 to the bus use request adjusting apparatus 108 and 111 is a signal line for inputting the signal BSYDMA indicating that processing cannot be interrupted because DMA transfer is currently executed to the bus use request adjusting apparatus 108. Symbol 12 is a signal line for inputting the signal HOLD indicating a hold request to the bus use request adjusting apparatus 108. Symbol 113 is a signal line for inputting the bus use request signal BRQREF of the refresh control unit (REF) 106 to the bus use request adjusting apparatus 108 and 114 is a signal line for inputting the signal BSYREF indicating that the refresh control unit 106 is in a state in which processing cannot be interrupted (e.g. during refresh) to the use request adjusting apparatus 108.

Symbol 116 is a signal line for outputting the bus use permission signal CPUST to the CPU 101 from the bus use request adjusting apparatus 108, 117 is a signal line for outputting the bus use permission signal DMAST to the DMA processor (DMA) 103 from the bus use request adjusting apparatus 108, 17 is a signal line for outputting the response signal HOLDA for the external bus use request signal HOLD, and 118 is a signal line for outputting the bus use permission signal REFST to the refresh control unit (REF) 106 from the bus use request adjusting apparatus 108.

The CPU 101, DMA processor (DMA) 103, and refresh control unit (REF) 106 in the first embodiment hold the states of the signals BSYCPU, BSYDMA, and BSYREF respectively when they interrupt processing because no bus use permission can be received or no processing is necessary.

Figure 2:
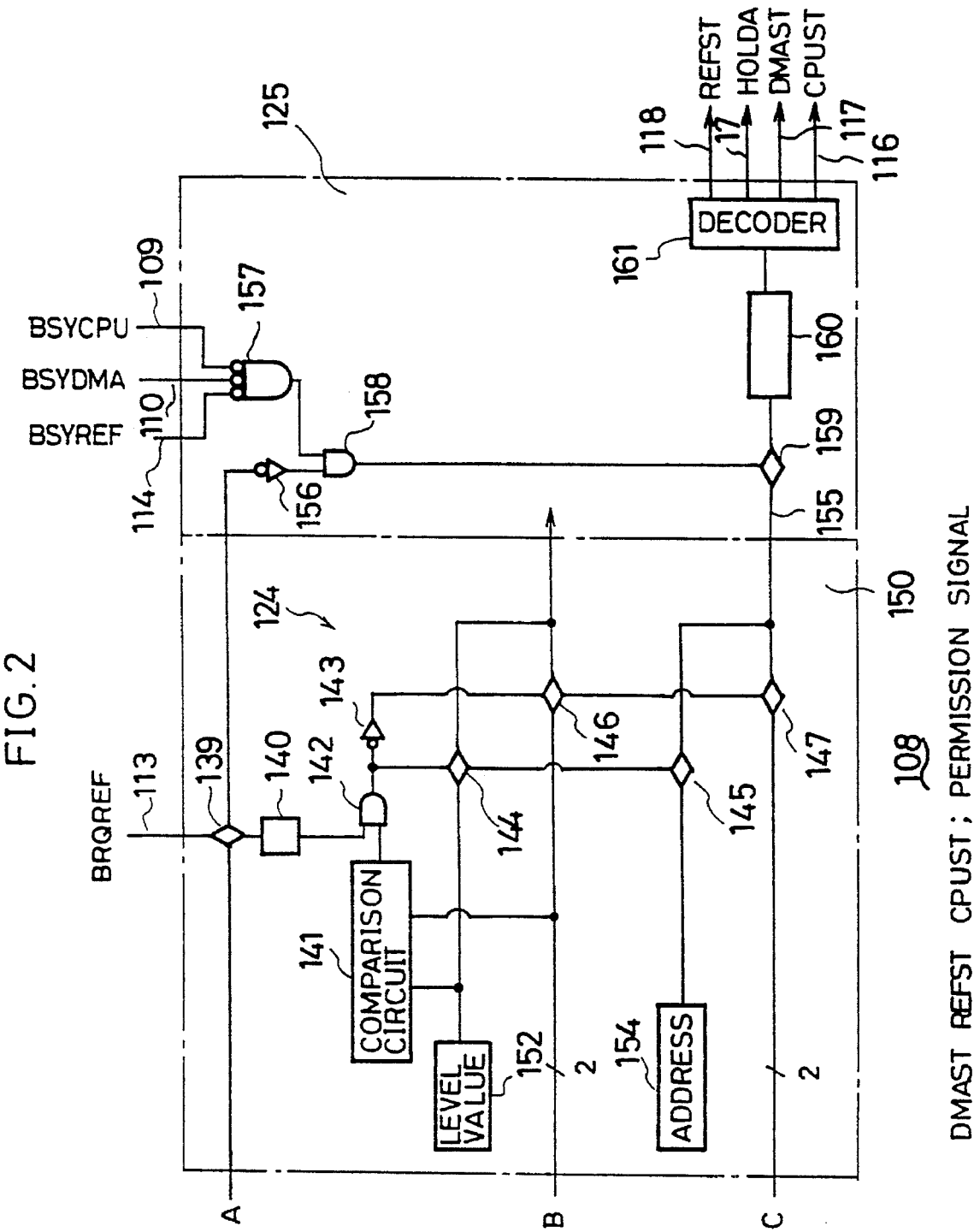
FIG. 2 is another partial block diagram of the bus use request adjusting apparatus of the first embodiment of the present invention.

FIGS. 1 and 2 show detailed constitutions of the bus use request adjusting apparatus 108 of the first embodiment of the present invention. In FIGS. 1 and 2, symbol 129 is a system synchronizing signal ∅. Symbols 148, 149, and 150 are blocks having the same constitution. The block 148 processes the bus use request signal BRQDMA of the DMA processor 103, the block 149 processes the signal HOLD indicating a hold request, and the block 150 processes the bus use request signal BRQREF of the refresh control unit 106.

The blocks 134, 151, and 152 are 2-bit reloadable registers serving as memory means for holding values "01", "10", and "11" corresponding to the priority levels of DMA request, hold request, and refresh request respectively by recording them in the form of software or in prescribed hardware. Symbols 162, 153, and 154 are 2-bit constant registers for storing address values "01", "10", and "11" indicating the DMA control unit 103, hold request Hd, and refresh control unit 106 respectively, and these values can be read any time. For example, the register 134 holds the value "01" corresponding to the priority level for the bus request of the DMA control unit 103. Increase of the value represents that the level gets higher.

Symbol 139 common to each block is a transfer gate to be turned on when the system synchronizing signal ∅ comes to the logic "1" and 140 is a latch circuit for holding the logic of a turned-on signal when the transfer gate 139 is turned on. Symbol 141 common to each block is a comparator serving as comparison means for comparing the data in the registers 134, 151, and 152 with the priority level sent to a priority level line 50 from an external unit and outputting the logic "1" respectively only when the data in the resisters 134, 151, and 152 are larger than the priority level. Symbol 142 common to each block is an AND gate for generating the logical multiplication of the output of each latch circuit 140 and that of each comparator 141 and symbol 143 is a NOT gate for reversing the output received from the each AND gate 142. Symbols 144 and 145 common to each block are a set of transfer gates to be turned on when the output of the AND gate 142 comes to the logic "1" and symbols 146 and 147 are a set of transfer gates to be turned on when the output of the NOT gate 143 comes to the logic "1". The transfer gates 139, 144, 145, 146, and 147, the latch circuit 140, the AND gate 142, and the NOT gate 143 of each block constitute the selection means 124.

The blocks 148, 149, and 150 are connected in series. Each block compares the priority level sent to the priority level line 50 from an external unit with its own priority level, that is, with the data in the register 134, 151, or 152 by each comparator 141 if each bus request signal is inputted, that is, if the bus use request signal BRQDMA, signal HOLD, or bus use request signal BRQREF comes to the logic "1", and replaces the sent priority level with the own priority level and an address indicating a unit to sent them to the blocks 148 to 149 in order if the own priority level is higher than the sent priority level. For cases other than the above, each block sends the sent priority level and address directly to the blocks 148 to 149 in order to compare them with the next priority level if the own priority level is lower than the sent priority level.

Because the initial priority level and address are previously set to the low-order value "00", the request address of the unit concerned is outputted according to the function of the comparator 141 described above if at least one of the bus use request signal BRQDMA, signal HOLD, and bus use request signal BRQREF comes to the logic "1". If all of the bus use request signal BRQDMA, signal HOLD, and bus use request signal BRQREF come to the logic "0" (that is, if no request is given), the value "00" in an address line 51 is directly outputted from an output terminal 155. In this case, the address value "00" corresponds to the CPU 101.

Symbol 156 is a NOT gate for reversing the synchronous clock of the system, 157 is a logic gate for outputting the logic "1" when all of the signals of BSYCPU, BSYDMA, and BSYREF come to the logic "0", 158 is an AND gate for outputting the logic "1" when the outputs of both the NOT gate 156 and logic gate 157 come to the logic "1". Symbol 159 is a transfer gate to be turned on when the output of the AND gate 158 comes to the logic "1". Symbol 160 is a latch circuit which holds the value in the output terminal 155 when the transfer gate 159 is turned on. Symbol 161 is a decoder which decodes the data in the latch circuit 160 to set one of the bus use permission signal SPUST, bus use permission signal DMAST, response signal HOLDA, and bus use permission signal FEFST to the logic "1". The NOT gate 156, logic gate 157, AND gate 158, transfer gate 159, latch circuit 160, and decoder 161 constitute the output control means 125. Therefore, the states of the bus use permission signal CPUST, bus use permission signal DMAST, response signal HOLDA, and bus use permission signal REFST change when all of the signals BSYREF, BSYCPU, and BSYDMA come to the logic "0", that is, when all of the CPU 101, DMA processor (DMA) 103, and refresh control unit (REF) 106 come to the state capable of interrupting processing (in other words, when all of them are at the breakpoint terminating fine processings during the original processing).

The following is the description of the operation of the first embodiment of the present invention. In this case, for example, "01" is set to the register 134, "10" to the register 151, and "11" to the register 152 so that the bus request priority level of the CPU 101 is the lowest and the priority level gets higher in order of the DMA processor (DMA) 103, external HOLD request, and refresh control unit (REF) 106. Moreover, it is assumed that the DMA processor (DMA) 103 is set so as to perform two-time DMA transfer under the burst state when receiving the signal DMAR0. One-time DMA transfer of the DMA processor (DMA) 103 is executed in three cycles in which actual transfer is executed in two cycles and internal processing without transfer is executed in one cycle.

Figure 4:
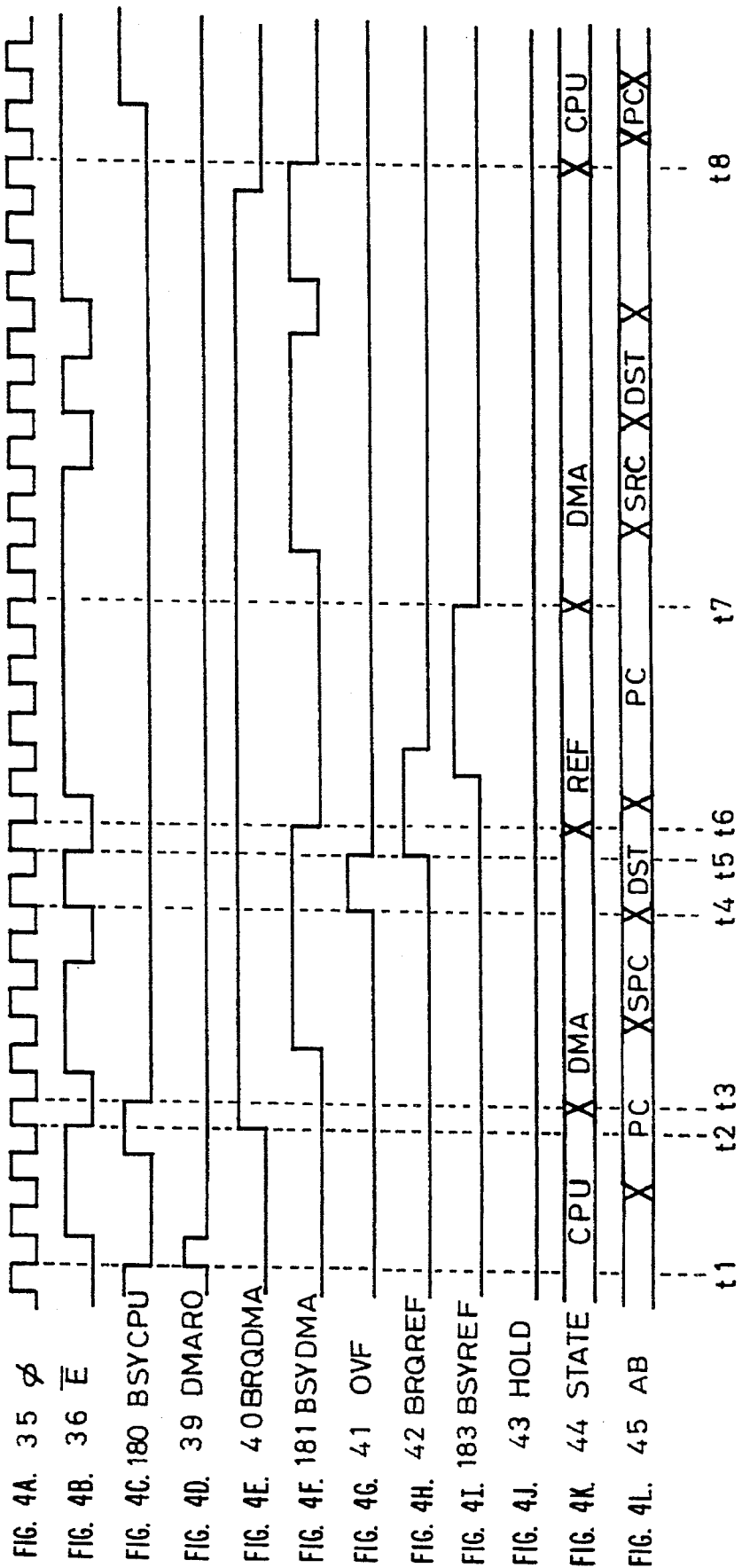
FIG. 4 is a timing chart showing the operation of the microcomputer system using the bus use request adjusting apparatus of the first embodiment of the present invention.

FIG. 4 is a timing chart showing the operation of the microcomputer system using the bus use request adjusting apparatus 108 of the first embodiment of the present invention. In FIG. 4, symbol 35 is a synchronous clock ∅ of the system, 36 is a signal E (reverse) which comes to the logic "0" when the data in the data bus is valid, and 180 shows that state of a signal BSYCPU. Symbol 39 is a signal DMAR0, 40 is a bus use request signal BRQDMA, and 181 shows the state of a signal BSYDMA. Symbol 41 is a signal OVF which comes to the logic "1" when a counter stored in a refresh control unit (REF) 106 overflows, 42 is a signal BRQREF, and 183 shows the state of a signal BSYREF. Symbol 43 shows the state of a signal HOLD. Symbol 44 shows the units {CPU 1, DMA processor (DMA) 103, and refresh control unit (REF) 106} provided with bus use permission at each time and 45 shows which operational state (PC, SRC, or DST) an address in an address bus 4 at each time corresponds to. In this case, PC, SRC, and DST show that the data in a program counter of the CPU 101, the data in a source address pointer of the DMA processor 103, and the data in a destination address pointer of the DMA processor 103 are outputted to the address bus 4 respectively.

At the time of t1, a direct memory access request signal (DMA signal) DMAR0 is inputted to the DMA processor (DMA) 103 from a peripheral unit or the like. When receiving the signal, the DMA processor (DMA) 103 causes the bus use request signal BRQDMA to rise at the time of t2 in order to read data (symbol 40 in FIG. 4). At the time of t3, the signals BSYCPU, BSYDMA, and BSYREF come to the logic "0" (symbols 180, 39, and 183 in FIG. 4). Because a signal at the logic "1" is only the bus use request signal BRQDMA among the bus use request signal BRQDMA, signal HOLD, and bus use request signal BRQREF, a bus use permission signal DMAST (signal line 117 in FIG. 3) is outputted from the bus use request adjusting apparatus 108. Therefore, the DMA processor (DMA) 103 obtains the bus use right to start DMA transfer. The states SRC and DST of the address bus 4 show that the transfer source address and transfer destination address are outputted to the address bus during DMA transfer (symbol 45 in FIG. 4).

When the signal OVF rises at the time of t4 (symbol 41 in FIG. 4), the refresh control unit (REF) 106 causes the bus use request signal BRQREF to rise at the time of t5 (symbol 42 in FIG. 4). At the time of t6, the DMA processor (DMA) 103 causes the signal BSYDMA to fall (symbol 181 in FIG. 4) in order to release the bus because it completes one-time DMA transfer and starts internal processing by the next cycle. Thereby, the signals BSYCPU, BSYDMA, and BSYREF come to the logic "0" (symbols 180, 181, and 183 in FIG. 4), and the bus use permission signal REFST (signal line 118 in FIG. 3) corresponding to the priority level "11" is outputted from the bus use request adjusting apparatus 108 according the priority because signal at the logic "1" are the bus use request signals BRQDMA and BRQREF (symbols 39 and 42 in FIG. 4) among the bus use request signal BRQDMA, signal HOLD, and bus use request signal BRQREF. Therefore, the refresh control unit (REF) 106 obtains the bus use right to start the refresh of DRAM. However, because DMA transfer has not ended yet, the bus use request signal BRQDMA is kept at the logic "1" during the refresh (symbol 40 in FIG. 4).

When the refresh ends at the time of t7, the signals BSYCPU, BSYDMA, and BSYREF come to the logic "0" (symbols 180, 181, and 183 in FIG. 4). At this point of time, the DMA processor (DMA) 103 obtains the bus use right to restart DMA transfer which has been interrupted because a signal at the logic "1" is only the bus use request signal BRQDMA among the bus use request signal BRQDMA, signal HOLD, and bus use request signal BRQREF. When DMA transfer ends at the time of t8, the signal BSYDMA falls (symbol 181 in FIG. 4) and the bus use request signal BRQDMA, signal HOLD, and bus use request signal BRQREF come to the logic "0" (symbols 40, 43, and 42 in FIG. 4). Therefore, the CPU 101 obtains the bus use right to restart the processing which has been interrupted.

Embodiment 2

The second embodiment of the present invention is described below by referring to the drawings. However, the description of the portions described in the embodiment according to the prior art or the first embodiment is omitted.

Figure 7:
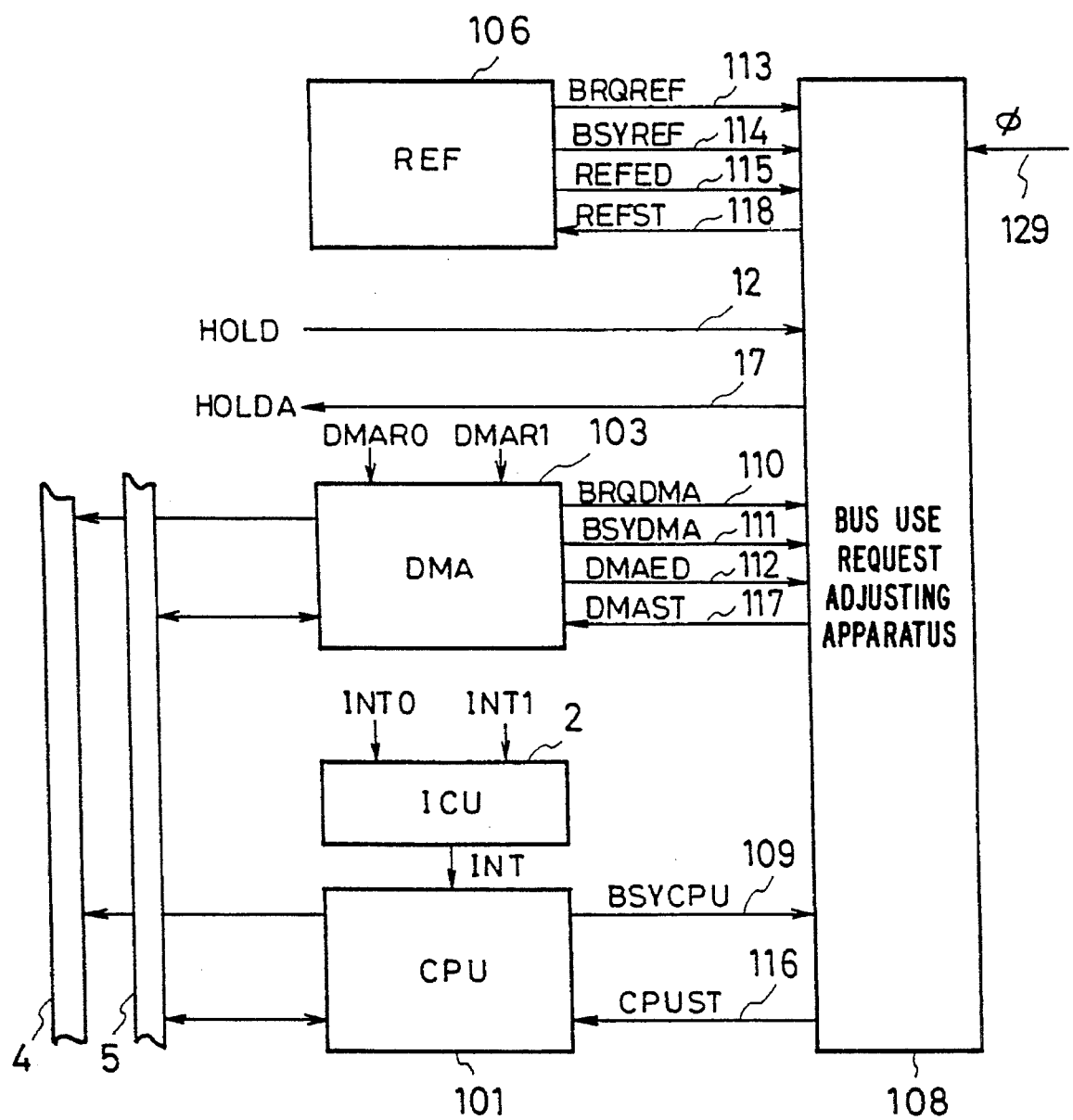
FIG. 7 is a block diagram of the entire microcomputer system using the bus use request adjusting apparatus of the second embodiment of the present invention.

FIG. 7 is a block diagram of the entire microcomputer system using the bus use request adjusting apparatus of the second embodiment of the present invention.

In FIG. 7, symbol 112 is a signal line for inputting the end of a series of DMA transfer processings to the bus use request adjusting apparatus 108. Symbol 115 is a signal line for inputting a signal REFED indicating that the refresh control unit 106 completes a processing to the bus use request adjusting apparatus 108.

Figure 5:
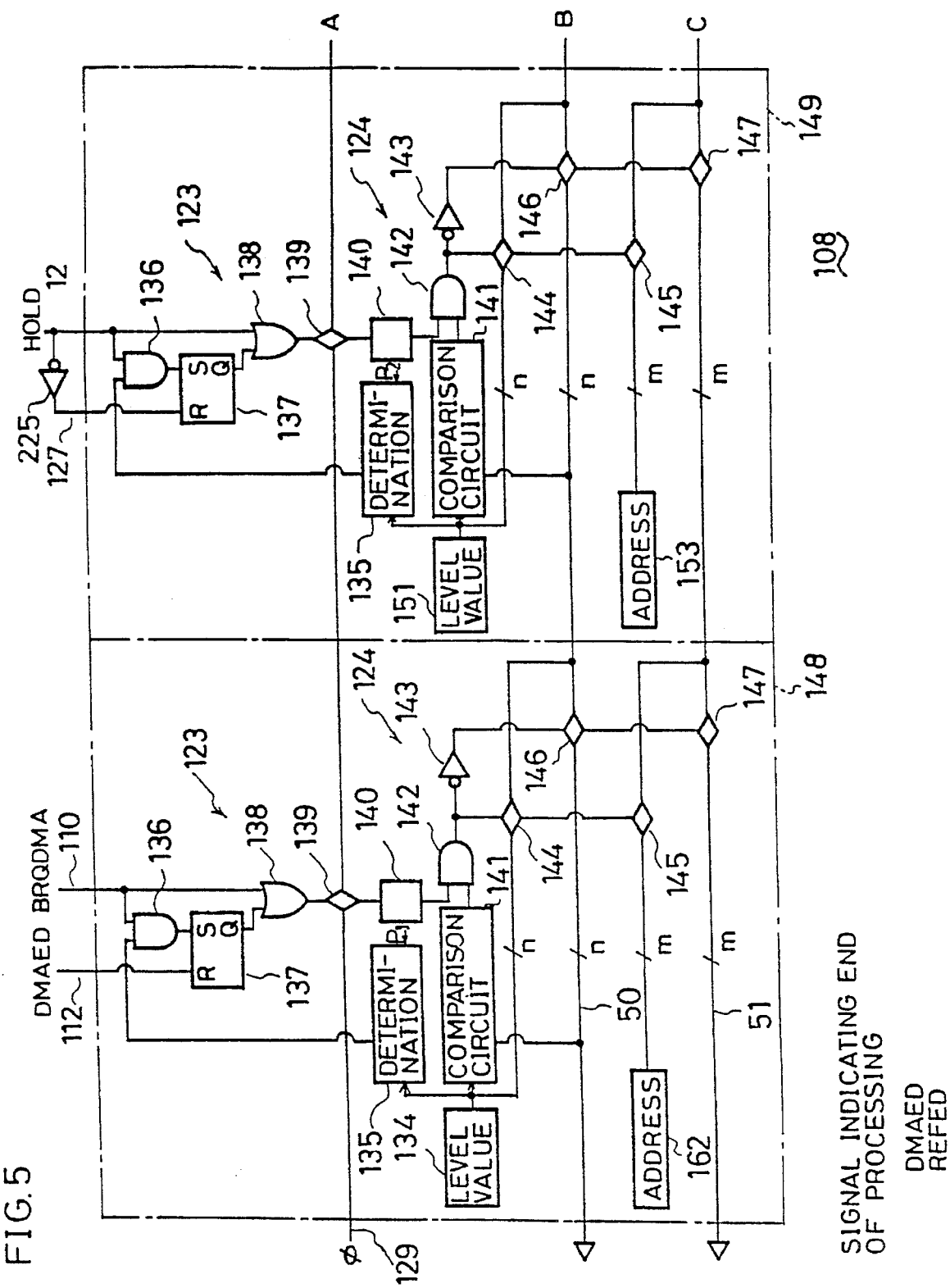
FIG. 5 is a partial block diagram of the bus use request adjusting apparatus of the second embodiment of the present invention.
Figure 6:
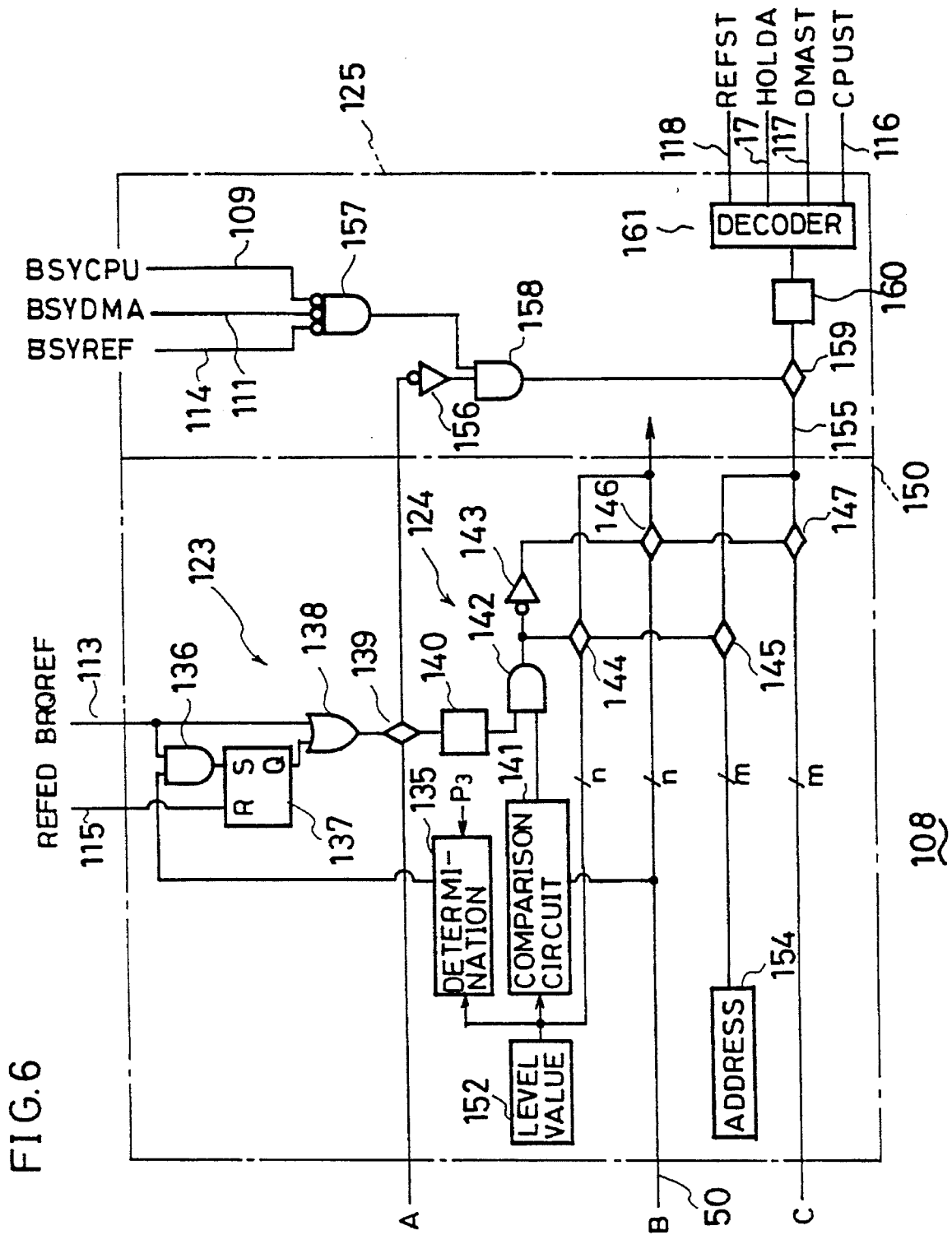
FIG. 6 is another partial block diagram of the bus use request adjusting apparatus of the second embodiment of the present invention.

Details of the second embodiment of the present invention are described below by referring to FIGS. 5 and 6. However, the description of the portions described in the embodiment according to the prior art and the first embodiment is omitted. FIGS. 5 and 6 are detailed block diagrams of the bus use request adjusting apparatus 108 of the second invention of the present invention. Reloadable n-bit registers 134, 151, and 152 hold specific values corresponding to the priority levels of DMA request, hold request, and refresh request respectively. These specific values may be those set to hardware or programmable. M-bit constant registers 162, 153, and 154 of each block hold the addresses indicating the DMA control unit (DMA) 103, hold request, and refresh control unit (REF) 106 respectively and these addresses can be read any time. Symbol 225 is a NOT gate for reversing the received signal HOLD and 127 is an output terminal of the NOT gate 225.

Blocks 148, 149, and 150 have the same constitution and are set by corresponding to each bus request source. The second embodiment is different from the first embodiment in the fact that each block is provided with a priority level determiner 135, holding circuit 123, and logic gate 138. The holding means 123 comprises a logic gate 136 and flip-flop 137. The reloadable n-bit register 134 holds a value corresponding to the bus request priority level of the DMA control unit 103. Increase of this value represents that the level gets higher. The priority level determiner 135 of each block compares the priority levels held by the registers 134, 151, and 152 with a previously-programmed specific value PL and outputs the logic "1" only when a priority level hold by the register 134, 151, 152 is larger than the specific value.

Symbol 136 common to each block is an AND gate for generating the logical multiplication of the output of the priority level determiner 135 and the signal inputted from each of the input terminals 110, 12, and 113, symbol 137 common to each block is a flip-flop which is set when the output of the AND gate 136 comes to the logic "1" and reset when the signal inputted from each of the input terminals 112, 127, and 115 comes to "1", and symbol 138 common to each block is an OR gate for generating the logical sum of the output of each flip-flop 137 and the signal inputted from each of the input terminals 110, 12, and 113, and the output of the OR gate is used as the input of the corresponding transfer gate 139. The AND gate 136, flip-flop 137, and OR gate 138 constitute each holding means 123.

Symbol 139 common to each block is a transfer gate to be turned on when the system synchronizing signal ∅ comes to the logic "1" and 140 is a latch circuit for holding the logic of the turned-on signal when the transfer fate 139 is turned on. Symbol 141 common to each block is a comparator for comparing the data in each register 134 with the priority level sent to the priority level line 50 and outputting the logic "1" only when the data in the register 134 is larger than the priority level. Symbol 142 common to each block is an AND gate for generating the logical multiplication of the output of each latch circuit 140 and the output of each comparator 141 and symbol 143 common to each block is a NOT gate for reversing the output received from each AND gate 142. Symbols 144 and 145 common to each block are a set of "n" transfer gates and a set of "m" transfer gates to be turned on when the output of each AND gate 142 comes to the logic "1" and symbols 146 and 147 are a set of "n" transfer gates and a set of "m" transfer gates to be turned on when the output of each NOT gate 143 comes to the logic "1". The m-bit constant registers 162, 153, and 154 are connected to m-pieces of transfer gates 145 of the respectively corresponding block.

The blocks 148, 149, and 150 are connected in series. Each block compares the priority level sent to each priority level line 50 with is own priority level until a signal indicating the end of a series of processing, that is, a signal DMAED, signal REFED, or the output of the NOT gate 25 comes to "1" after a bus request signal is outputted, that is, after the logic "1" changes to the logic "0" while the bus use request signal BRQDMA, signal HOLD, or bus use request signal BRQREF of the bus request source covered by each block is kept at the logic "1" or when the own priority level, that is, the data in the register 134, 151, or 152 is determined to be a specific level or higher by each comparator 141. And, if the own priority level is higher, each block replaces the sent priority level and the address indicating a unit with its own priority level and an address indicating the unit to send them to the next block. For cases other than the above, each block sends the sent priority level and address directly to the next block. Because both the initial priority level and address have the value "1", the value "0" is directly outputted from the output terminal 155 if all blocks send the priority level and address sent to the priority level line 50 and address line 51 directly to the next block. The address value "0" corresponds to the request of the CPU 101. Because the circuits of the block 150 forward are the same as those of the first embodiment, their description is omitted. The number of blocks is not restricted to three—148, 149, and 150. It is possible to use many blocks according to the number of request source units.

The operation of the second embodiment is described below. In this case, for example, the registers 134, 151, and 152 are set so that the bus request priority level of the CPU 10 is lower, the priority level gets higher in order of the refresh control unit (REF) 106 and DMA processor (DMA) 103, and the external request HOLD has the highest priority level. It is assumed that all priority levels are previously programmed so that they are determined to be smaller than the specific values P1, P2, and P3 by the priority level determiner 135 of each block.

Figure 8:
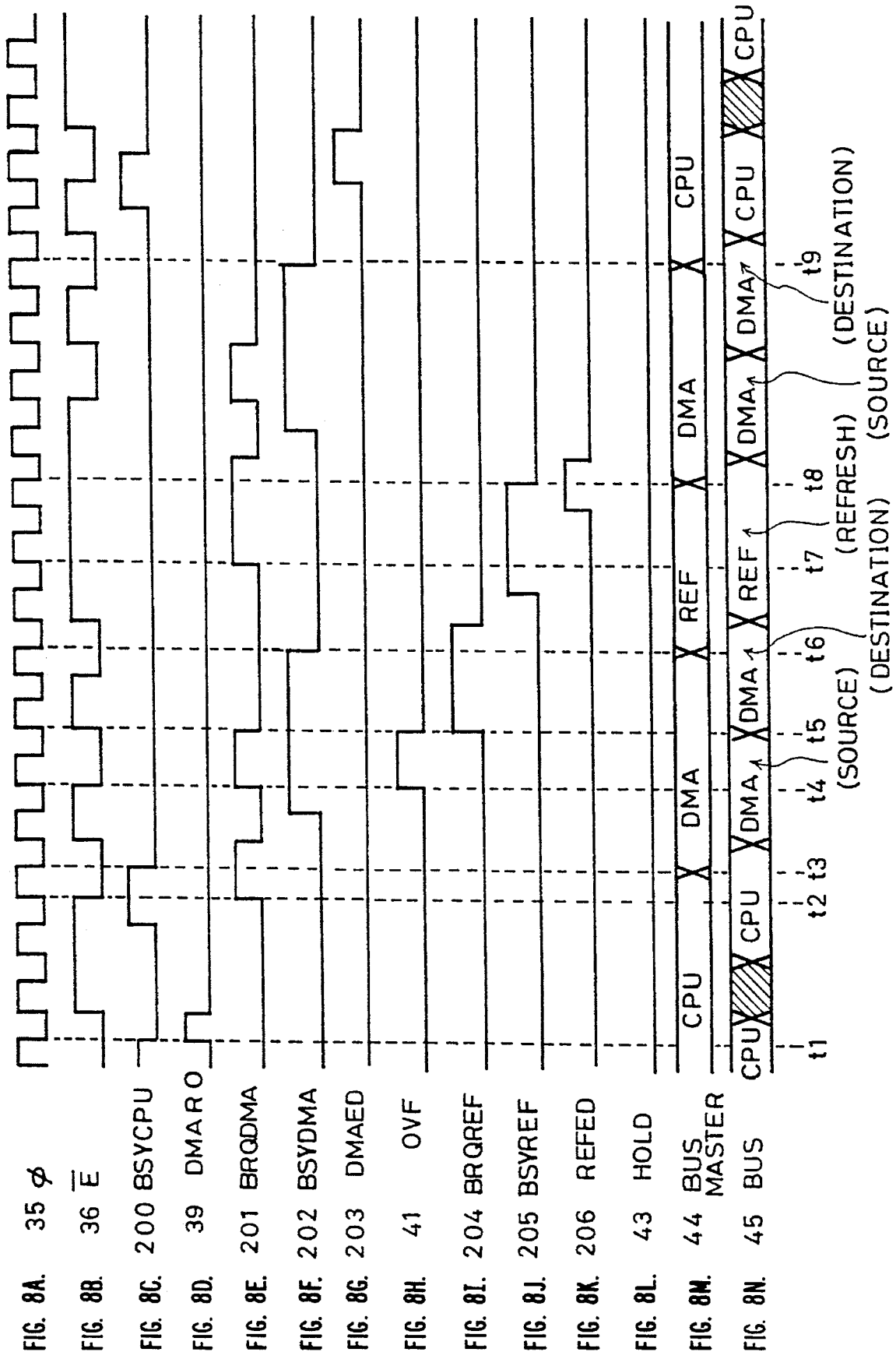
FIG. 8 is a timing chart showing one operation of the microcomputer system using the bus use request adjusting apparatus of the second invention of the present invention.

FIG. 8 is a timing chart showing one operation of the microcomputer system using the bus use request adjusting apparatus of the second embodiment of the present invention. In FIG. 8, symbol 35 is a synchronous clock ∅ of the system, 36 is a signal E (reverse) which comes to the logic "0" when the data in the data bus is valid, and 200 shows the state of a signal BSYCPU. Symbol 39 is a signal DMAR0, 201 is a bus use request bus use request signal BRQDMA, 202 is a signal BSYDMA, and 203 shows the state of a signal DMAED. Symbol 41 is a signal OVF which comes to the logic "1" when a counter stored in a refresh control unit (REF) 106 overflows, 204 is a bus use request signal BRQREF, 205 is a signal BSYREF, and 206 shows the state of a signal REFED. Symbol 43 shows the state of a signal HOLD. Symbol 44 shows a unit provided with bus use permission at each time and 45 shows what an address in an address bus corresponds to.

At the time of t1, the DMA signal DMAR0 is inputted to the DMA processor (DMA) 103. By receiving the signal, the DMA processor (DMA) 103 causes the bus use request signal BRQDMA to rise at the time of t2 in order to read data (symbol 201 in FIG. 8). At the time of t3, the signals BSYCPU, BSYDMA, and BSYREF are kept at the logic "0" (symbols 200, 202, and 205 in FIG. 8) and a signal at the logic "1" is only the bus use request signal BRQDMA among the bus use request signal BRQDMA, signal HOLD, and bus use request signal BRQREF (symbols 201, 43, and 204 in FIG. 8). Therefore, the bus use permission signal DMAST (FIG. 7) is outputted from the bus use request adjusting apparatus 108. Therefore, the DMA processor (DMA) 103 obtains the bus use right to start DMA transfer.

When the signal OVF rises at the time of t4, the refresh control unit (REF) 106 cause the bus use request signal BRQREF to rise at the time of t5 (symbol 204 in FIG. 8). At the time of t6, the DMA processor (DMA) 103 causes the signal BSYDMA to fall (symbol 202 in FIG. 8) in order to release buses because it completes one-time DMA transfer and starts internal processing by the next cycle. Thereby, the signals BSYCPU, BSYDMA, and BSYREF come to the logic "0" (symbols 200, 202, and 205 in FIG. 8), and the signal REFST is outputted from the bus use request adjusting apparatus 108 because a signal at the logic "1" is only the bus use request signal BRQREF among the bus use request signal BRQDMA, signal HOLD, and bus use request signal BRQREF. Therefore, the refresh control unit (REF) 106 obtains the bus use right to start the refresh of DRAM.

At the time of t7, the DMA processor (DMA) 103 causes the bus use request signal BRQDMA to rise (symbol 201 in FIG. 8) in order to perform the second-time DMA transfer. In this case, however, the refresh control unit (REF) 106 is still executing refresh, the signal BSYREF still rises, and the DMA processor 103 cannot obtain the bus use right.

At the time of t8, because refresh end by the next cycle, the signal BSYREF falls (symbol 205 in FIG. 8) and the signals BSYCPU, BSYDMA, and BSYREF come to the logic "0" (symbols 200, 202, and 205 in FIG. 8). At this point of time, a signal at the logic "1" is only the bus use request signal BRQDMA among the bus use request signal BRQDMA, signal HOLD, and bus use request signal BRQREF (symbols 201, 43, and 204 in FIG. 8). Therefore, the DMA processor (DMA) 103 obtains the bus use right to restart the DMA transfer which has been interrupted.

At the time of t'9, because DMA transfer ends by the next cycle, the signal BSYDMA falls (symbol 202 in FIG. 8). At this point of time, the bus use request signal BRQDMA, signal HOLD, and bus use request signal BRQREF (symbols 201, 43, and 204 in FIG. 8) come to the logic "0". Therefore, the CPU 101 obtains the bus use right and restarts the processing which has been interrupted.

Figure 9:
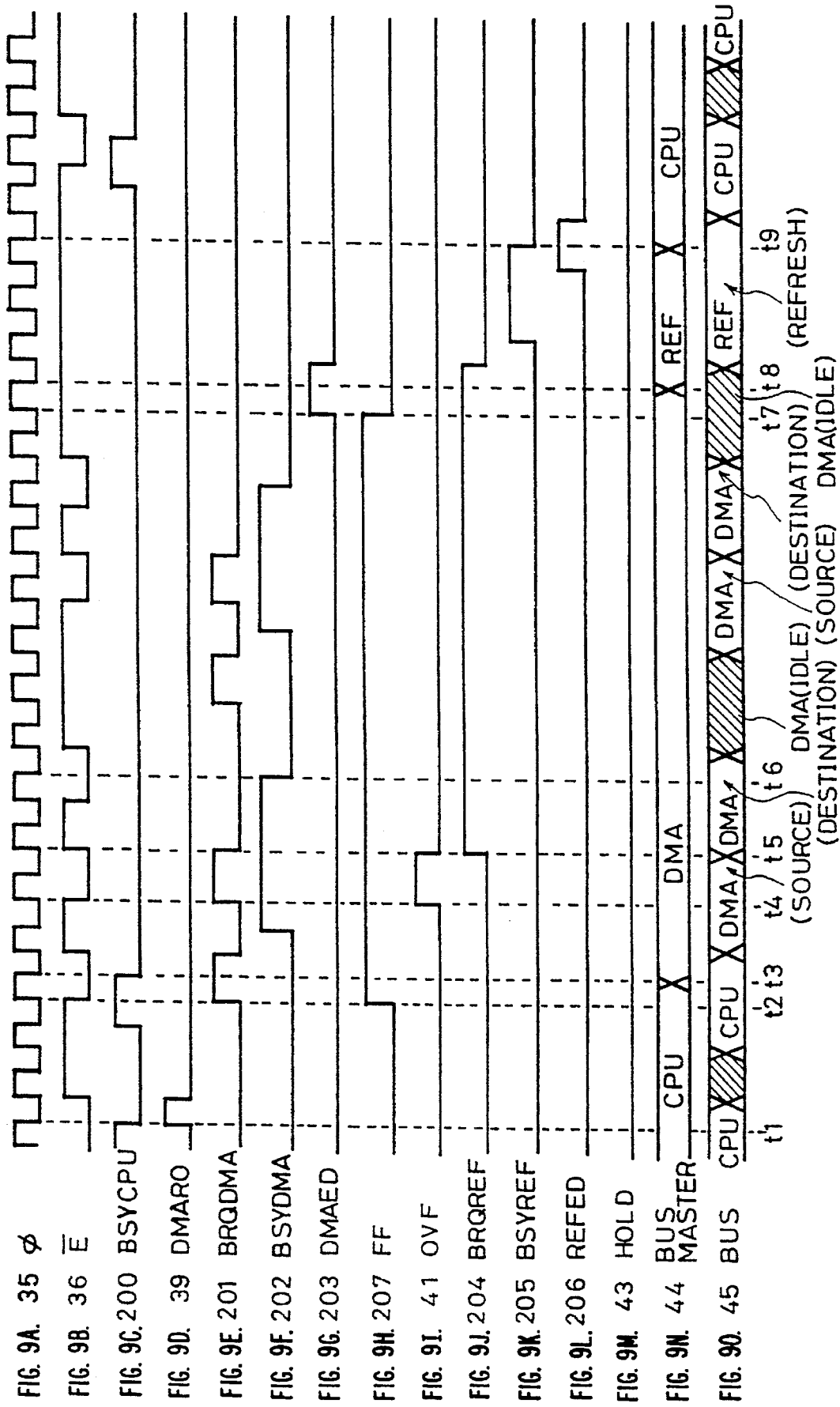
FIG. 9 is a timing chart showing the other operation of the microcomputer system using the bus use request adjusting apparatus of the second embodiment of the present invention.

A case is described below in which the priority level of the DMA processor (DMA) 103 of the block 148 and the priority level of the external request HOLD of the block 149 are programmed so that they are determined to be larger than a specific value by the respectively corresponding priority level determiner 135 by referring to FIG. 9. FIG. 9 is a timing chart showing the other operation of the microcomputer system using the bus use request adjusting apparatus of the second embodiment of the present invention. In FIG. 9, a signal same as that in FIG. 8 is provided with the same symbol and its description is omitted. Symbol 207 shows the output of the flip-flop 137 of the block 148.

At the time of t'1, the DMA signal DMAR0 is inputted to the DMA processor (DMA) 103 from an external unit. By receiving the signal, the DMA processor (DMA) 103 causes the bus use request signal BRQDMA to raise at the time of t'2 in order to read data (symbol 201 in FIG. 9). In this case, the flip-flop 137 of the block 148 is also set to H at the same time because the output of the priority level determiner 135 of the block 148 is kept at the logic "1". At the time of t'3, the signals BSYCPU, BSYDMA, and BSYREF come to the logic "0" (symbols 200, 202, and 205 in FIG. 9), and the bus use permission signal DMAST is outputted from the bus use request adjusting apparatus 108 because a signal at the logic "1" is only the bus use request signal BRQDMA among the bus use request signal BRQDMA, signal HOLD, and bus use request signal BRQREF symbols 202, 43, and 204 in FIG. 9). Therefore, the DMA processor (DMA) 103 obtains the bus use right.

When the signal OVF rises at the time of t'4 (symbol 41 in FIG. 9), the refresh control unit (REF) 106 causes the signal BRQREF to rise at the time of t'5. At the time of t'6, the DMA processor (DMA) 103 causes the signal BSYDMA to fall (symbol 202 in FIG. 9) in order to release buses because it completes one-time DMA transfer and starts internal processing by the next cycle. Thereby, the signals BSYCPU, BSYDMA, and BSYREF come to the logic "0" (symbols 200, 202, and 205 in FIG. 9). Though the bus use request signal BRQREF at the bus request logic "1" is inputted from the refresh control unit (REF) 106 through the input terminal 113 in FIG. 6 (signal line in FIG. 7), the output of the OR gate 138 is "1" which is the same as the case when the bus use request signal BRQDMA has the logic "1" because the flip-flop 137 of the block 148 is set. Because the priority level of the bus use request BRQDMA is higher than that of the bus use request signal BRQREF and there is no external bus request HOLD, the DMA processor (DMA) 103 still holds the bus use right.

At the time of t'7, the DMA processor (DMA) 103 detects that DMA transfer ends and causes the signal DMAED to rise (symbol 203 in FIG. 9). Because the signal DMAED is inputted to the block 148 from the input terminal 112 in FIG. 5, the flip-flop 137 receiving the signal is reset. Because an interrupt is not accepted before the flip-flop 137 is reset, DMA transfer is prevented from being interrupted and thereby, bus use change is securely performed.

At the time of t'8, the signals BSYCPU, BSYDMA, and BSYREF are kept at the logic "0" (symbols 200, 202, and 203 in FIG. 9) and a signal at the logic "1" is only the bus use request signal BRQREF among the bus use request signal BRQDMA, signal HOLD, and bus use request signal BRQREF. Therefore, the value in the priority level line 50 is kept at the initial value "0" which is the bus request priority level of the CPU. Because only the bus request priority level of the CPU is present in the priority level line 50, the refresh control unit (REF) 106 obtains the bus use right according to the signal BRQREF inputted to the input terminal 113 of the block 150.

At the time of t'9, the signal BSYREF falls (symbol 205 in FIG. 9) because refresh ends by the next cycle. At this point of time, because the bus use request signal BRQDMA, signal HOLD, and bus use request signal BRQREF come to the logic "0" (symbols 202, 43, and 204 in FIG. 9), the CPU 101 continuously outputting a use request to the priority level line obtains the bus use right and restarts the processing which has been interrupted. Therefore, when units for outputting a bus use request are newly added to the microcomputer, it is possible to use the added units on equal terms with the existing units except some units. Thus, there is an advantage that development for addition is simplified.

Embodiment 3

Figure 10:
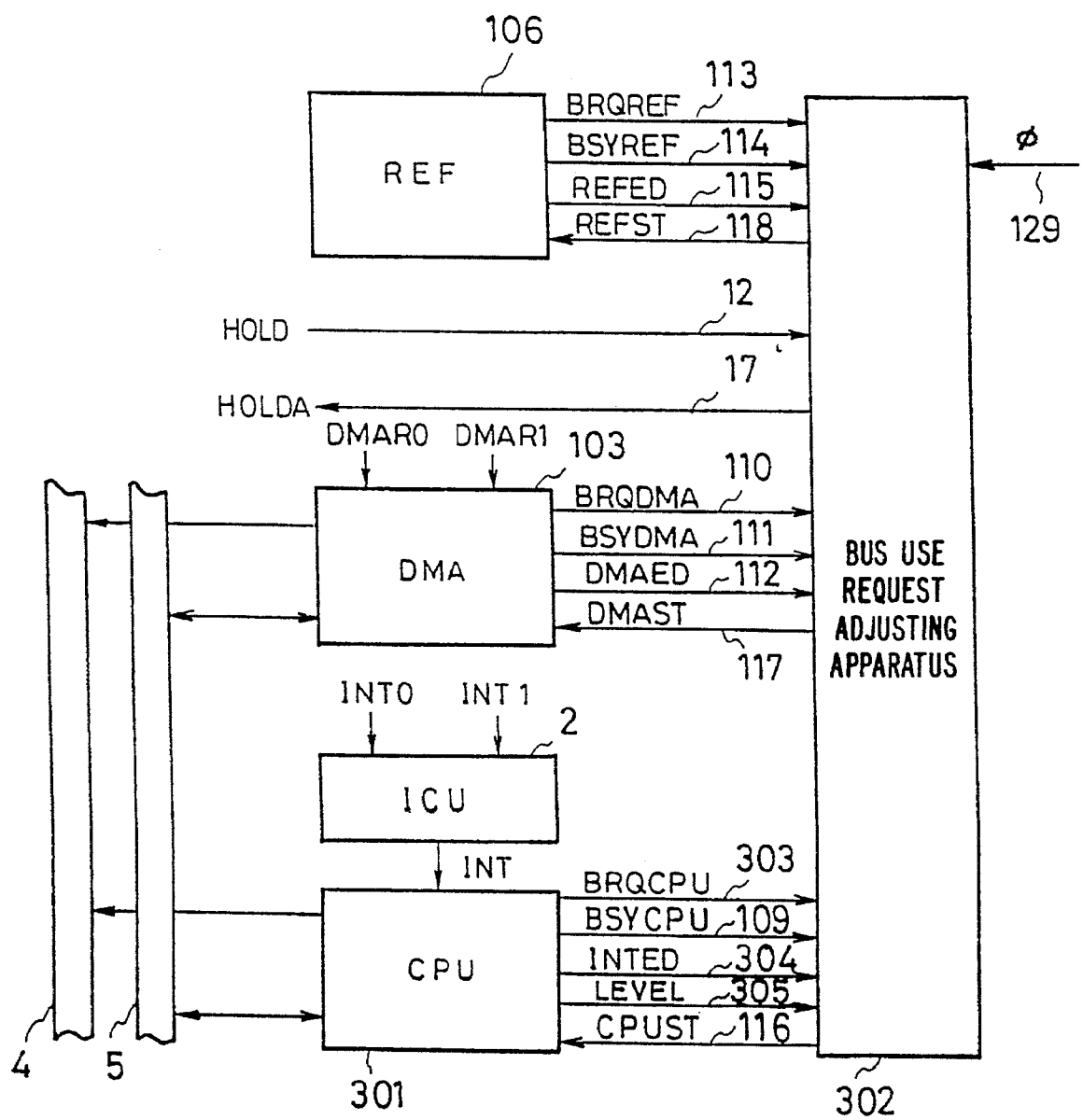
FIG. 10 is a block diagram of the entire microcomputer system using the bus use request adjusting apparatus of the third embodiment of the present invention.

The following is the description of the bus use request adjusting apparatus of the third embodiment of the present invention. There are usually many bus use factors for a CPU and they can be controlled by interrupt priority levels. That is, a high priority level is given to a bus use factor with a high criticality is processed by the CPU prior to other factors. Therefore, while the CPU processes the factor with a high criticality, it is desired to dynamically change the bus use priority level of the CPU prior to other units outputting a bus use request so that the CPU can use buses. A bus request adjusting circuit of the embodiment is described below by referring to FIGS. 10, 11, and 12. However, the description of the portions already described in the embodiment according to the prior art or the first and second embodiments is omitted. FIG. 10 is a block diagram of the entire microcomputer system using the bus use request adjusting apparatus of the third embodiment of the present invention.

In FIG. 10, symbol 30 is a CPU, 103 is a DMA processor (DMA), and 302 is a bus use request adjusting apparatus for adjusting bus use requests sent from the external hold request (HOLD) and refresh control unit (REF) 106.

Symbol 303 is a signal line for inputting a bus use request signal BRQCPU of the CPU 301 to the bus use request adjusting apparatus 302, 109 is a signal line for inputting the bus use request signal BRQCPU of the CPU 301 to the bus use request adjusting apparatus 302, 109 is a signal line for inputting a signal BSYCPU indicating that the CPU 301 is in a state in which it cannot interrupt processing, for example, it is using buses to the bus use request adjusting apparatus 302, 304 is a signal line for inputting a signal INTED indicating the end of interrupt processing to the bus use request adjusting apparatus 302, and 305 is a signal line for inputting the interrupt priority level of the processing currently executed by the CPU 301 to the bus use request adjusting apparatus 302. Symbol 110 is a signal line for inputting a bus use request signal BRQDMA of the DMA processor (DMA) 103 to the bus use request adjusting apparatus 302, 111 is a signal line for inputting a signal BSYDMA indicating a state in which the processing for DMA transfer cannot be interrupted to the bus use request adjusting apparatus 302, and 112 is a signal line for inputting a signal DMAED indicating the end of a series of DMA transfer processings to the bus use request adjusting apparatus 302.

Symbol 12 is a signal line for inputting a signal HOLD indicating a hold request to the bus use request adjusting apparatus 302. Symbol 113 is a signal line for inputting a bus use request signal BRQREF of the refresh control unit (REF) 106 to the bus use request adjusting apparatus 302, 114 is a signal line for inputting a signal BSYREF indicating that the refresh control unit (REF) 106 is under a state in which it cannot interrupt processing (e.g. state during refresh) to the bus use request adjusting apparatus 302, and 115 is a signal line for inputting a signal REFED indicating that the refresh control unit (REF) 106 completes the processing to the bus use request adjusting apparatus 302.

Symbol 116 is a signal line for inputting a bus use permission signal CPUST for the CPU 301 to the CPU 301 from the bus use request adjusting apparatus 302, 117 is a signal line for inputting a bus use permission signal DMAST for the DMA processor (DMA) 103 to the DMA processor (DMA) 103 from the bus use request adjusting apparatus 302, 17 is a signal line for outputting a response signal HOLDA for the signal HOLD sent from an external unit, and 118 is a signal line for inputting a bus use permission signal REFST for the refresh control unit (REF) 106 to the refresh control unit (REF) 106 from the bus use request adjusting apparatus 302.

In this embodiment, the CPU 301, DMA processor (DMA) 103, and refresh control unit (REF) 106 hold the states of the signals BSYCPU, BSYDMA, and BSYREF in which they interrupt processings because they cannot receive bus use permission or they do not need to perform processings, respectively.

Figure 11:
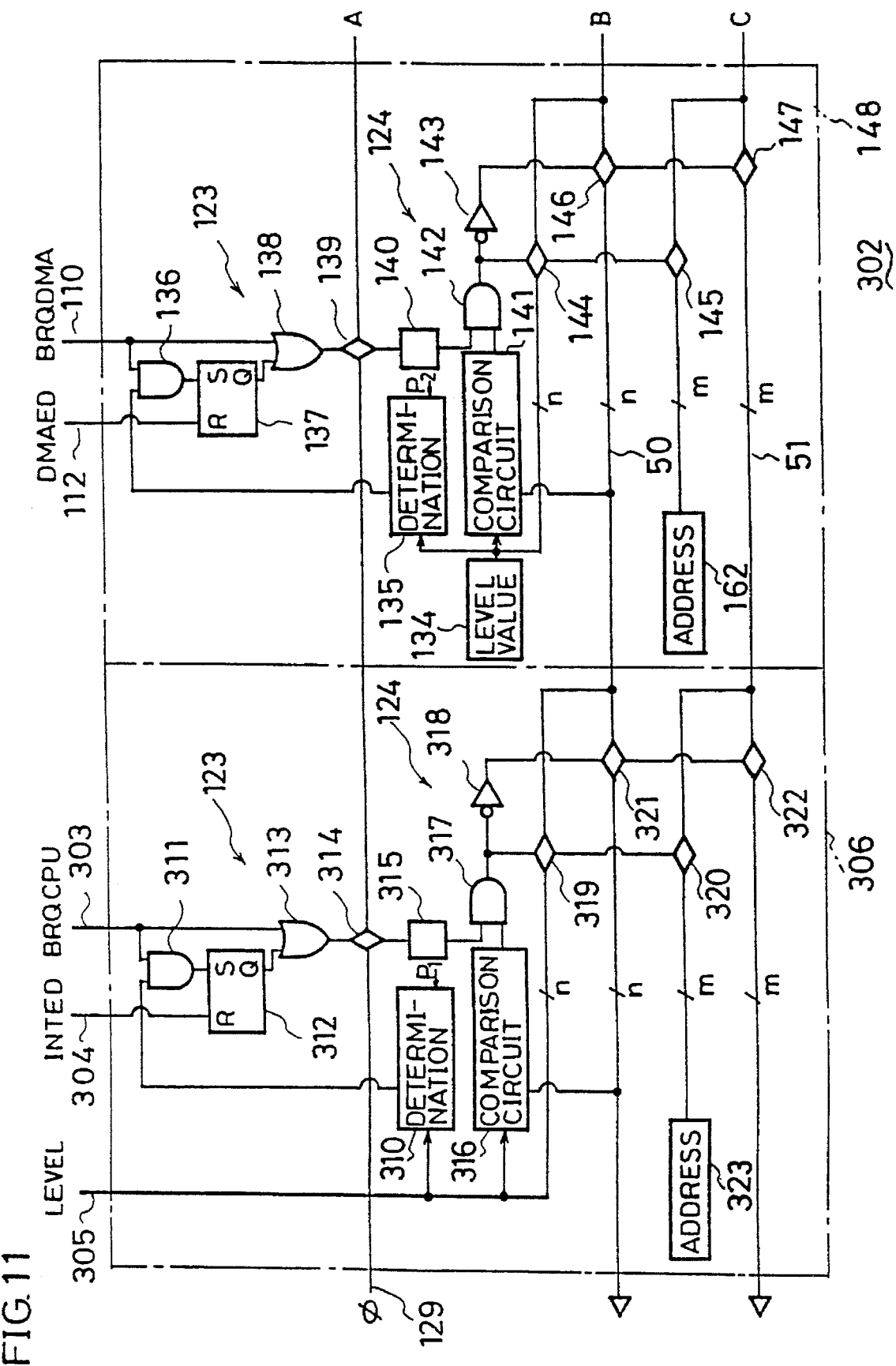
FIG. 11 is a partial block diagram of the bus use request adjusting apparatus of the third embodiment of the present invention.
Figure 12:
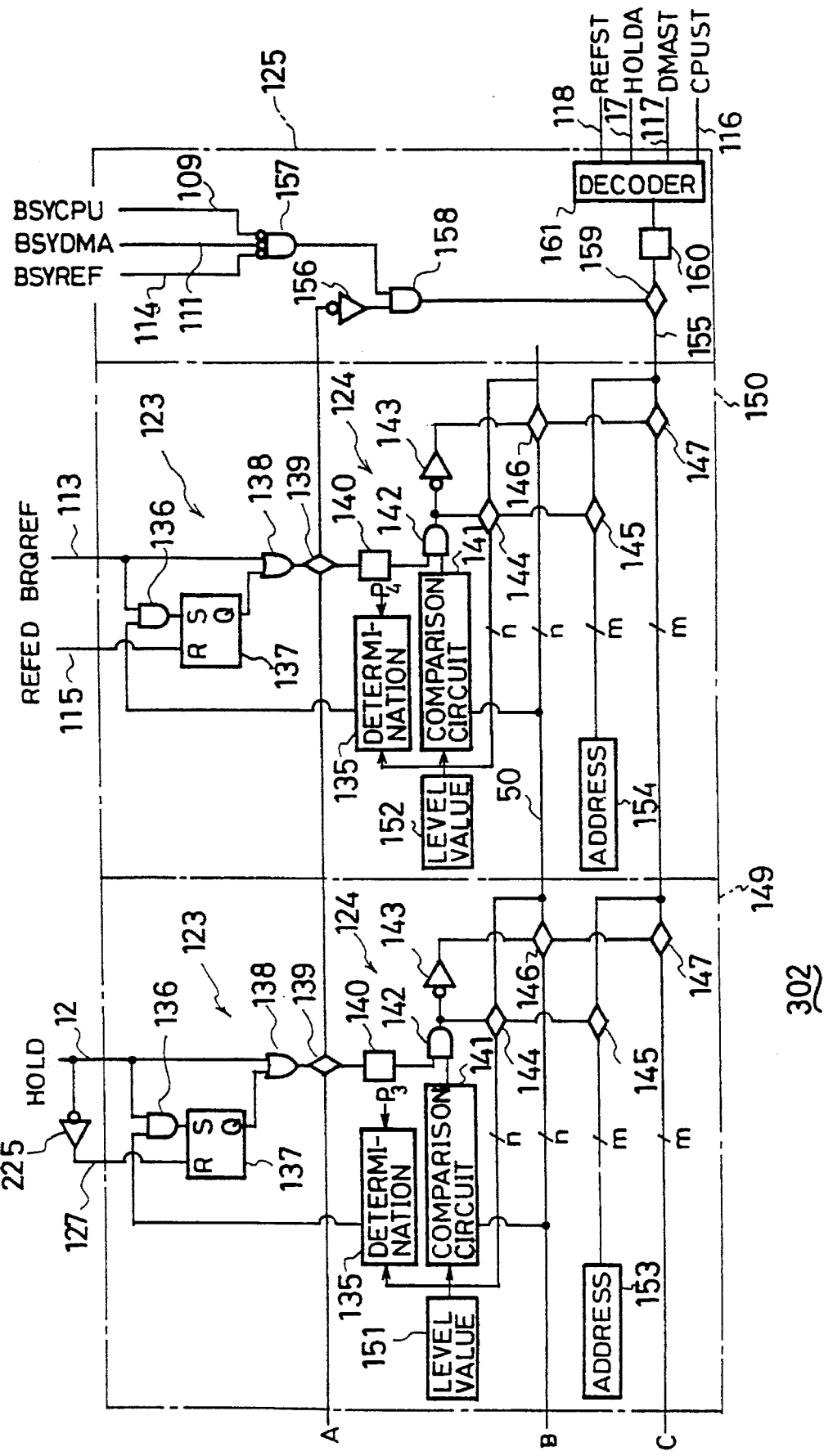
FIG. 12 is another partial block diagram of the bus use request adjusting apparatus of the third embodiment of the present invention.

FIGS. 11 and 12 are detailed block diagrams of the bus use request adjusting apparatus 302 of the third embodiment of the present invention. The bus use request adjusting apparatus 302 is constituted by adding a block 306 before the block 148 of the bus use request adjusting apparatus 108 of the first embodiment. Therefore, a component common to that of the bus use request adjusting apparatus 108 is provided with the same symbol and its description is omitted.

Symbol 310 is a priority level determiner for comparing an interrupt priority level required by the CPU 301 with the specific value P1 and outputting the logic "1" only when the interrupt priority level is larger than the specific values P1 to P4. Symbol 311 is an AND gate for generating the logical multiplication of the output of the priority level determiner 310 and the signal inputted from the input terminal 303, 312 is a flip-flop to be set when the output of the AND gate 311 comes to the logic "1" and to be reset when the interrupt end signal INTED inputted from the input terminal 304 comes to "1", and 313 is an OR gate for generating the logical sum of the output of the flip-flop 312 and the signal inputted from the input terminal 303 and the output of the OR gate is used as the input of a transfer gate 314.

The transfer gate 314 is tuned on when a system synchronizing signal Ø comes to the logic "1". Symbol 315 is a latch circuit for holding the logic of the turned-on signal when the transfer gate 314 is turned on. Symbol 316 is a comparator for comparing an interrupt priority level required by the CPU with a priority level sent to the priority level line 50 and outputting the logic "1" only when the interrupt priority level is larger. Symbol 317 is an AND gate for generating the logical multiplication of the output of the latch circuit 315 and the output of the comparator 316 and 318 is a NOT gate for reversing the output received from the AND gate 317. Symbols 319 and 320 are a set of "n" transfer gates and a set of "m" transfer gates to be turned on when the output of the AND gate 317 comes to the logic "1" respectively, and symbol 321 and 322 are a set of "n" transfer gates and a set of "m" transfer gates to be turned on when the output of the NOT gate 318 comes to the logic "1". Symbol 323 is an m-bit constant register, from which an address indicating the CPU 301 can be read any time. In this case, "m" is equal to the bit width of the interrupt priority level.

Blocks 306, 148, 149, and 150 are connected in series. Each block compares a sent priority level with its own priority level and replaces the sent priority level and an address indicating a unit with its own priority level and the address indicating the unit if its own priority level is higher to send them to the next block or sends the sent priority level and address directly to the next block for cases other than the above until such signals indicating the end of a series of processings such as INTED, DMAED, and REFED or the output of the NOT gate 225 come to "1" after the bus use request signal changes from the logic "1" to the logic "0" while the inputted bus use request signal, that is, the signal BREQCPU, bus use request signal BRQDMA, signal HOLD, or bus use request signal BRQREF is kept at the logic "1" and when its own priority level, that is, the interrupt priority level, and the data in the register 134, 151, or 152 are determined to be equal to or higher than a specific level by the comparator 316 or the comparator of each block.

For the third embodiment, the priority level of the CPU 301 is determined to be larger than the specific level by the level determiner 310 if the interrupt priority level of the CPU 301 inputted to the comparator 316 and level determiner 310 of the block 306 is set very high. Therefore, other units with a bus use request request priority level lower than the interrupt priority level of the CPU 301 do not use any bus as long as the request of the CPU continues even if the CPU 301 does not use any bus. Thus, the CPU 301 can preferentially execute processings.

However, if the interrupt priority level of the CPU 301 inputted to the comparator 316 and level determiner 310 of the block 306 is set very low, it is determined to be equal to or lower than the specific value by the level determiner 310. Therefore, the priority level of a request source can pass through the priority level line 50 of the block 306. Thus, even a unit with a low priority level can use buses when the CPU 301 does not use any bus and the bus use efficiency is improved.

Figure 13:
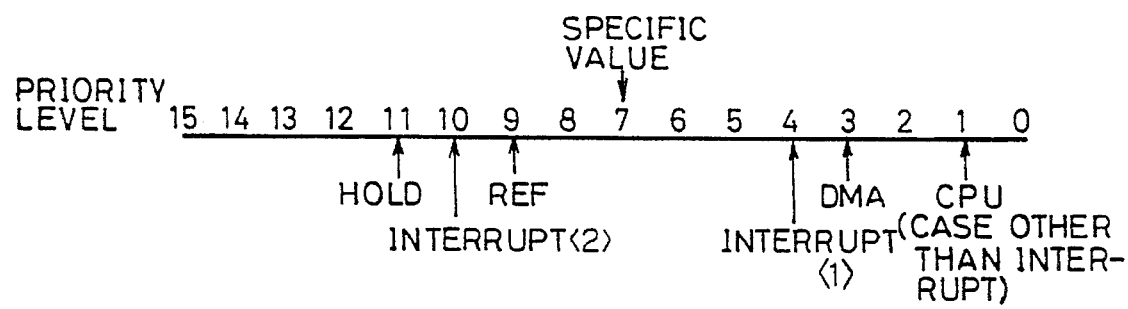
FIG. 13 is an illustration for explaining a priority level operation.
Figure 14:
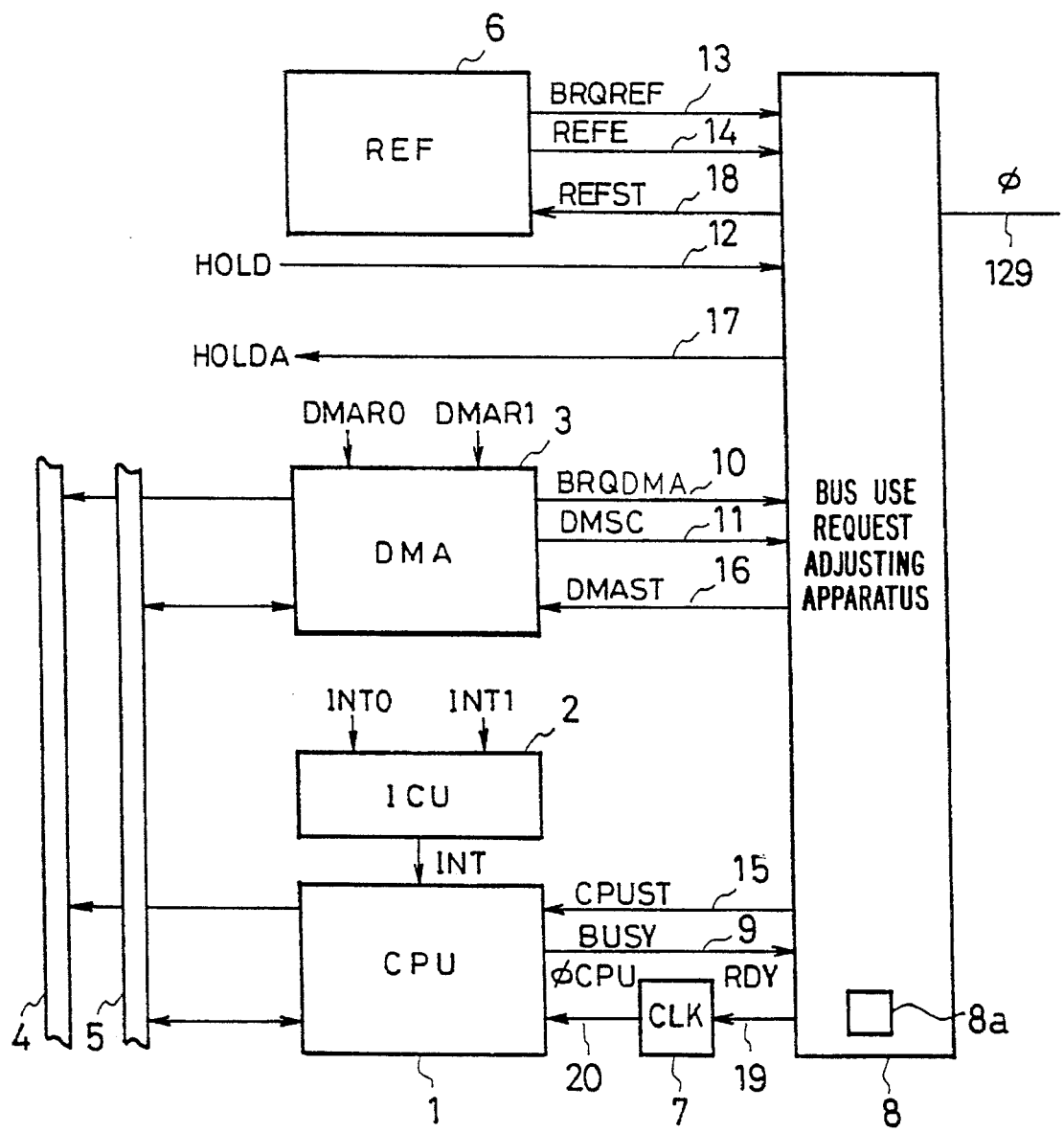
FIG. 14 is a block diagram of the microcomputer system using a bus use request adjusting apparatus according to the prior art.
Figure 15:
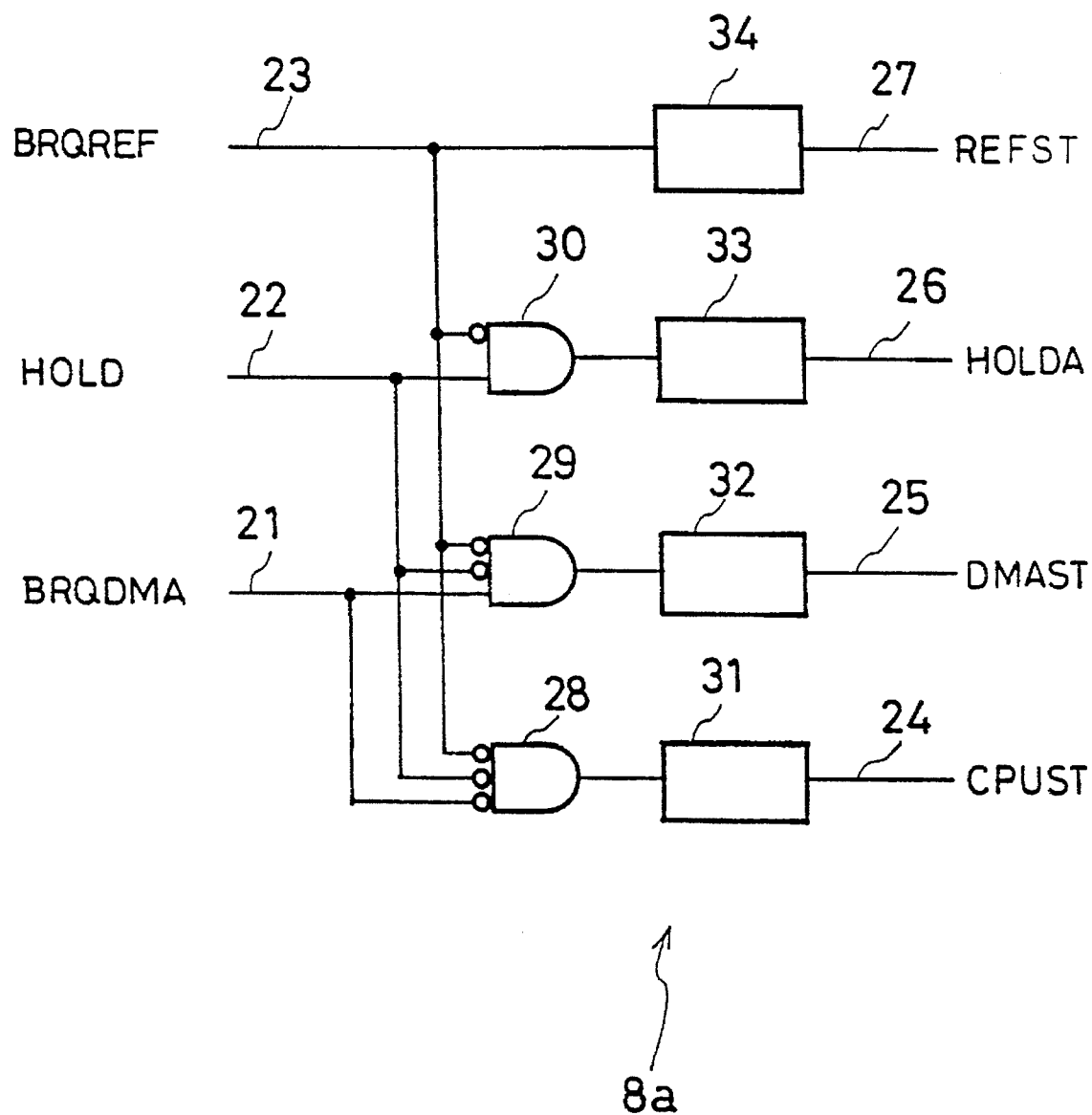
FIG. 15 shows a bus use request adjusting apparatus according to the prior art.

The operation when a priority level is changed on a program is described below in detail by referring to FIG. 13. FIG. 13 explains the operation for the priority level. The priority level and interrupt priority level can be programmed form "0" to "15" respectively. When the bus priority level of the request source is higher than the value 7, the determiner 135 determines that the priority level is higher than the specific value 7.

The priority level when each unit does not perform interrupt processing is assumed as "1" and used as the bus priority level of the CPU. When the CPU 301 processes the interrupt <1>, the bus request level of the CPU 301 is set to "4". In this case, because 4≦7, the bus request of the CPU 306 is not held by the holding means 123. Therefore, if the DMA processor 103 outputs a bus request when the CPU 301 does not use the bus 5, it can use the bus 5. When the cpu 301 processes the interrupt <2>, the bus request level of the CPU 301 is set to "10". In this case, because 10>7, the bus request of the CPU 301 is held by the holding means 123. Therefore, because it is considered that the CPU 301 continuously outputs a bus request, the DMA processor 103 and REF unit 106 cannot use the bus 5 even if they output a bus request. HOLD has higher priority level than the interrupt <2>, it can use buses by outputting a bus request.

Interrupt priority levels are stored in registers of the ICU 2 and can be programmed.

For this embodiment, an interrupt priority level is inputted to the bus use request adjusting apparatus 302. However, by inputting only the high-order part of the interrupt priority level to the bus use request adjusting apparatus 302 or by using only the number of bits to cover the number of bus use request sources like the first embodiment, it is possible to decrease the number of bits "n" of the n-bit registers 134, 151, and 152. Moreover, because the registers 134, 151, and 152 are downsized, it is advantageous in view of the cost.

Advantage of the Invention

The first invention is constituted as a bus use request adjusting apparatus connected with a plurality of processors for outputting a bus use request signal and a signal indicating that processing cannot be interrupted and comprising memory means for holding bus use request priority levels corresponding to the processors, comparison means for comparing a received bus use request signal with the priority levels, selection means for selecting a bus use request priority level corresponding to each processor, and output control means for outputting a signal indicating that all processor can interrupt processings. Therefore, the first invention makes it possible to change the bus use request priority levels of the processors. The second invention determines whether to compare the priority level of a processor with that of the other processor until a signal indicating the end of a series of processings of a processor becomes valid after the bus use request signal of the processor becomes valid or to compare the priority level of a processor with that of the other processor only while the bus use request signal is valid according to the the priority level of the processor. Therefore, the second invention has an advantage for improving the bus efficiency.

Third invention is constituted as a bus use request adjusting apparatus connected with a plurality of processors for outputting at least one of a bus use request signal, signal indicating that processing cannot be interrupted, and signal indicating the end of the processing, and comprising memory means for holding bus use request priority levels corresponding to the processors, comparison means for comparing a received bus use request signal with the priority levels, selection means for assigning bus use permission to the processor of the bus use request source with a high priority level according to the comparison result, determination means for comparing a bus use request priority level with a predetermined specific level and outputting a determination signal, holding means for holding a bus use request signal from a processor until a signal indicating the end of processing is inputted according to the determination signal, and output control means for outputting a bus use permission signal when none of the processors output a signal indicating that processing cannot be interrupted. Moreover, the third invention has an advantage that the processing speed of a CPU is highly maintained by giving no bus use permission to a unit with lower priority level even while the CPU does not use any bus when the interrupt priority level of the processing performed by the CPU is high by using an interrupt level as the bus use request priority level of the CPU and the bus efficiency is improved by giving bus use permission to a unit with lower priority level while the CPU does not use any bus when the interrupt priority level of the processing performed by the CPU is low.

What is claimed is:

1. A bus use request adjusting apparatus which accepts bus use request signals from a plurality of processors coupled to a common bus, wherein the apparatus outputs a bus use permission signal to a processor according to a priority order of the plurality of processors, the apparatus comprising:

means for accepting the bus use request signals from the plurality of processors;

means for accepting a signal from each of the plurality of processors or a central processing unit (CPU) indicating that processing cannot be interrupted;

a priority line to which a priority level value of a processor or the CPU having a bus use right is applied;

memory means for holding for each of the processors a bus use request priority level value which is changeable;

comparison means, coupled to the memory means and the priority line, for comparing the current priority level value on the priority line with the held bus use request priority level of a processor outputting a bus use request signal to the means for accepting the bus use request signals and for outputting a result signal based on the comparison;

selection means for outputting a select signal for selecting whether or not the priority level value of the processor read from the memory means should be applied to the priority line, according to the bus use request signal and the result signal; and output control means for outputting the bus use permission signal to a processor or the CPU having the priority level value applied to the priority line according to the select signal when none of the processors and the CPU output a signal indicating that processing cannot be interrupted.

2. The bus use request adjusting apparatus according to claim 1, wherein the plurality of processors include a direct memory access (DMA) control unit, a memory refresh control unit, and external devices.

3. The bus use request adjusting apparatus according to claim 2, wherein the bus use request signals are output from the DMA control unit, memory refresh control unit, and external devices.

4. The bus use request adjusting apparatus according to claim 1, which further comprises additional memory means for holding address values for each of the processors or the CPU.

5. A bus use request adjusting apparatus which accepts bus use request signals from a plurality of processors which are coupled to a common bus and outputs a bus use permission signal to a processor according to the priority order of the plurality of processors, the apparatus comprising:

means for accepting the bus use request signals from the plurality of processors;

means for accepting a signal from each of the plurality of processors or central processing unit (CPU) indicating that processing cannot be interrupted;

means for accepting a signal from each of the plurality of processors and the CPU indicating that processing is completed;

a priority line to which a priority level value of a processor or the CPU having a bus use right is applied;

memory means for holding for each of the processors a bus use request priority level value which is changeable;

comparison means, coupled to the memory means and the priority line, for comparing the current priority level value on the priority line with the held bus use request priority level of a processor outputting a bus use request signal to the means for accepting the bus use request signals and for outputting a result signal based on the comparison;

selection means for outputting a select signal for selecting whether or not the priority level value of the processor read from the memory means should be applied to the priority line, according to the bus use request signal and the result signal;

output control means for outputting the bus use permission signal to a processor or the CPU having the priority level value applied to the priority line according to the select signal when none of the processors and the CPU output a signal indicating that processing cannot be interrupted; and determination means for comparing the priority level value of the processor read from the memory means with the specific value which is set arbitrarily and for outputting a signal for determining whether the select signal should be output only during the time when the bus use request signal is effective or during the period from the time when the bus use request signal becomes effective to the time when the signal indicting that processing is completed is input.

6. The bus use request adjusting apparatus according to claim 5, wherein the plurality of processors include a direct memory access (DMA) control unit a memory refresh control unit, and external devices.

7. The bus use request adjusting apparatus according to claim 6, wherein the bus use request signals are output from the DMA control unit, memory refresh control unit and external devices.

8. The bus use request adjusting apparatus according to claim 5, which further comprises additional memory means for holding address values for each of the processors or the CPU.

* * * * *